US012710717B2

(12) United States Patent
Kataoka et al.

(10) Patent No.: US 12,710,717 B2
(45) Date of Patent: Aug. 18, 2026

(54) BOOKLET MANUFACTURING APPARATUS, BOOKLET MANUFACTURING SYSTEM, CONTROL METHOD, AND MEDIUM

(71) Applicant: CANON KABUSHIKI KAISHA, Tokyo (JP)

(72) Inventors: Hiroshi Kataoka, Shizuoka (JP); Kenji Takagi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/040,597

(22) Filed: Jan. 29, 2025

(65) Prior Publication Data

US 2025/0244703 A1 Jul. 31, 2025

(30) Foreign Application Priority Data

Jan. 31, 2024 (JP) ................................ 2024-013303

(51) Int. Cl.
*G03G 15/00* (2006.01)
*B42C 9/00* (2006.01)

(52) U.S. Cl.
CPC ....... *G03G 15/6544* (2013.01); *B42C 9/0081* (2013.01); *G03G 2215/00835* (2013.01)

(58) Field of Classification Search
CPC ...... G03G 2215/00835; G03G 15/6544; B42C 9/0081
See application file for complete search history.

(56) References Cited

U.S. PATENT DOCUMENTS 4,398,986 A * 8/1983 Smith, Jr. ............. B29C 65/305 156/290
2006/0051686 A1* 3/2006 Ide ..................... G03G 15/2064 430/123.54
2014/0072388 A1* 3/2014 Hashimoto ........ G03G 15/6544 412/1
2023/0348222 A1* 11/2023 Kawamura ............ B65H 37/04

FOREIGN PATENT DOCUMENTS

JP 2005215230 A 8/2005
JP 2013043751 A 3/2013
JP 2014237291 A * 12/2014

* cited by examiner

*Primary Examiner* — Jennifer Bahls
(74) *Attorney, Agent, or Firm* — Canon.U.S.A., Inc IP Division

(57) ABSTRACT

A control method is provided for a booklet manufacturing apparatus that manufactures booklets by performing thermocompression bonding on a printing material with a bonding agent image formed at a predetermined site by a bonding agent with thermoplasticity. The method comprises performing thermocompression bonding of the predetermined site of the printing material placed in a stacking unit using a thermocompression bonding unit; and before the printing material is placed in the stacking unit, in a case where a predetermined condition of a temperature of a pressing member being equal to or less than a threshold is satisfied, performing control of the thermocompression bonding unit and performing preliminary heating on the pressing member.

16 Claims, 25 Drawing Sheets

BOOKLET MANUFACTURING APPARATUS, BOOKLET MANUFACTURING SYSTEM, CONTROL METHOD, AND MEDIUM

BACKGROUND

Field of the Disclosure

The present disclosure relates to a booklet manufacturing apparatus, a control method, and a medium and particularly relates to a booklet manufacturing apparatus, a booklet manufacturing system, a control method, and a medium for manufacturing a bound booklet by bonding together a printing material and a printing material via thermocompression bonding in which a resin particle image for bonding formed on the printing material is melted and pressed, for example.

Description of the Related Art

Japanese Patent Laid-Open No. 2013-43751 describes a booklet manufacturing apparatus that manufactures a bound booklet by bonding together a printing material and a printing material via thermocompression bonding. According to Japanese Patent Laid-Open No. 2013-43751, a resin particle image (hereinafter referred to as a bonding toner image) for bonding together printing material P is formed and fixed to the printing material at the same time as a resin particle image (hereinafter referred to as an image toner image) is formed as a visible image on the printing material via an electrophotographic process. Thereafter, the printing materials with the formed bonding toner images are stacked and heated to melt and press the bonding toner. The bonding toner image formed on the printing material is not limited to being formed on a single side of the printing material, and the adhesiveness can be increased by forming it on both sides. The adhesiveness can also be controlled via the pattern and toner amount of the bonding toner image.

A booklet manufactured via such a booklet manufacturing technology may be a made of as little as two or more printing materials to as many as tens of printing materials, for example, 50 printing materials. The binding method for the printing material may use a corner fastener to bind the corner portions of the printing material, and edge fastener to bind the edge portions, or the like. In the case of a booklet of a plurality of pages, the printing material P can be bonded together via one instance of thermocompression bonding. However, if there is an attempt to bond a booklet of 50 or similar large number of pages via one instance of thermocompression bonding, there is a possibility of the amount of heat from the heat source being insufficient causing the bonding toner image to not melt and a possibility of the bonding strength between printing materials being insufficient causing printing materials to separate from the completed booklet.

Regarding this, Japanese Patent Laid-Open No. 2005-215230 describes manufacturing a booklet with a large number of pages of printing material by performing thermocompression bonding on a discretionary number of printing materials P (three in this example) and repeating this process a plurality of times.

Also, Japanese Patent Laid-Open No. 2014-237291 describes performing a preliminary heating process. According to Japanese Patent Laid-Open No. 2014-237291, preliminary heating to increase bonding strength includes bringing together a heat source for melting the bonding toner image to bond together printing materials and a pressing member disposed on either side the heat source and the printing materials at an unbonded time preceding the bonding of the printing materials to increase the temperature of the pressing member.

However, the booklet manufacturing apparatus described in Japanese Patent Laid-Open No. 2014-237291 may cause rapid degradation of the pressing member and plastic deformation due to the repeated preliminary heating process of bringing the heat source into contact with the pressing member at an unbonded time to increase the temperature and performing pressing. In a case where thermocompression bonding is performed with a pressing member that has undergone plastic deformation, the bonding portion between printing materials is deformed. This may lead to a decrease in the quality of the completed booklet.

SUMMARY

The present disclosure has been made in light of the known examples described above, and an aspect provides a booklet manufacturing apparatus that manufactures booklets by performing thermocompression bonding on a printing material with a bonding agent image formed at a predetermined site by a bonding agent with thermoplasticity, comprising: a stacking unit where the printing material in a stack is placed; a thermocompression bonding unit that performs thermocompression bonding of the predetermined site of the printing material placed in the stacking unit; a pressing member made of an elastic body disposed at a position opposing a portion that is subjected to thermocompression bonding by the thermocompression bonding unit; at least one memory storing instructions; and at least one processor that is in communication with the at least one memory and that, when executing the instructions, cooperates with the at least one memory to execute processing, the processing including before the printing material is placed in the stacking unit, in a case where a predetermined condition of a temperature of the pressing member being equal to or less than a threshold is satisfied, performing control of the thermocompression bonding unit and performing preliminary heating on the pressing member.

As described above, according to the present disclosure, a booklet manufacturing apparatus can be provided that can prevent deformation of a pressing member that heats a bonding agent and can avoid a decrease in the quality to completed booklets.

Further features of the present disclosure will become apparent from the following description of exemplary embodiments with reference to the attached drawings.

DESCRIPTION OF THE EMBODIMENTS

First Embodiment

Figure 1:
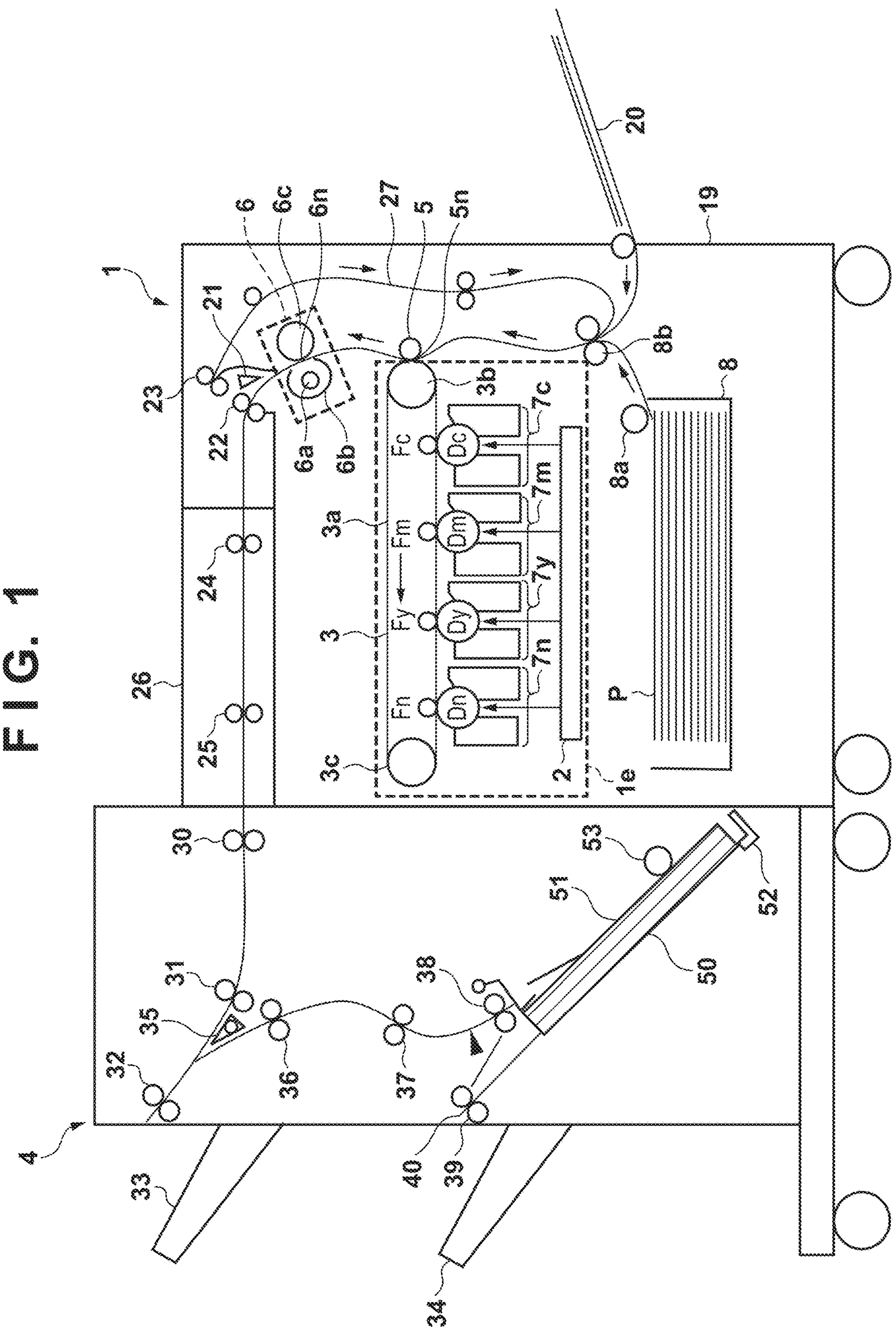
FIG. 1 is a block diagram of an image forming apparatus and a booklet manufacturing apparatus used in an embodiment of the present disclosure.

Hereinafter, embodiments will be described in detail with reference to the attached drawings. Note, the following embodiments are not intended to limit the scope of the claimed disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

Overall Configuration of Image Forming Apparatus

First, the overall configuration of an image forming apparatus will be described using FIG. 1. FIG. 1 is a schematic view illustrating a cross-sectional configuration of an image forming apparatus 1 according to the first embodiment. As illustrated in FIG. 1, the image forming apparatus 1 includes a cassette 8 for storing printing material P, an image forming unit 1*e* (in the dashed line frame) as an image forming unit, an image heating device 6 as a fixing unit, and a casing 19 that houses these. The image forming apparatus 1 has a print function for forming a toner image on the printing material P fed from the cassette 8 using the image forming unit 1*e* and executing fixing processing via the image heating device 6 to produce a printed product. In the present embodiment, the printing material P on which images can be formed is a cut sheet with a maximum size corresponding to A4 size (297 mm height×210 mm width). The A4 sized printing material P is conveyed in the height direction for image formation. The printing material P stored in the cassette 8 are fed one at a time from the cassette 8 by a feeding roller 8*a* and conveyed by a conveyance roller pair 8*b*. Also, the printing material P set in a multi-tray 20 can be fed one at a time.

The image forming unit 1*e* is a tandem electrophotographic unit including four process cartridges 7*n*, 7*y*, 7*m*, and 7*c*, a scanner unit 2, and a transfer unit 3. A process cartridge is an exchangeable integral unit including a plurality of components involved in the image forming process. Each process cartridge 7*n*, 7*y*, 7*m*, 7*c* includes a photosensitive drum Dn, Dy, Dm, Dc that is an image carrier, a non-illustrated charging roller that charges the photosensitive drum, and a non-illustrated toner housing unit that houses toner and supplies toner to the photosensitive drum. Of the four process cartridges, the three process cartridges 7*y*, 7*m*, 7*c* on the right side of the diagram are process cartridges for forming a visible image on the printing material P and respectively form a yellow, magenta, and cyan image toner image.

The process cartridge 7*n* on the left side of the diagram is for forming an image with bonding toner Tn for bonding together the printing material P and the printing material P after printing. In the present embodiment, in the case of printing a blank image such as text, black may be expressed by a process blank obtained by overlaying yellow, magenta, and cyan toner. However, for example, a fifth process cartridge using a black image toner may be added to the image forming unit 1*e* so that a black image can be expressed using black image toner. However, no such limitation is intended, and the type and number of image toners can change depending on the application of the image forming apparatus 1.

Image Toner

In the present embodiment, a known image toner can be used as the image toner for image formation. Among these, an image toner that uses thermoplastic resin as the binder resin is preferable. As long as the resin that can be used as a binder resin in the image toner is a thermoplastic resin, the resin is not particularly limited. For example, a resin typically used in image toners such as polyester resin, vinyl resin, acrylic resin, styrene-acrylic resin, and the like can be used. A plurality of these resins may be included. A colorant, a magnetic body, a charge control agent, wax, an external additive, and the like are added to form the image toner.

Bonding Toner

In the present embodiment, a bonding toner including a thermoplastic resin can be used as a bonding agent for bonding together printing material. As long as the resin that can be used as a bonding toner is a thermoplastic resin, the resin is not particularly limited, and a polyester resin, a vinyl resin, an acrylic resin, a styrene acrylic resin, or the like can be used as with the image toner. A plurality of these resins may be included. As with the image toner, a colorant, a magnetic body, a charge control agent, wax, an external additive, and the like may be added to form the bonding toner. Also, as long as it has sufficient adhesiveness, there is no problem using the image toner as the bonding toner.

Image Forming Process

The scanner unit 2 is an example of a electro-photographic exposure unit that emits laser light at the photosensitive drums of the process cartridges 7*n*, 7*y*, 7*m*, and 7*c* to form electrostatic latent images. The transfer unit 3 includes a transfer belt 3*a* that functions as an intermediate transfer body (secondary image carrier). The transfer belt 3*a* is mounted on a secondary transfer opposing roller 3*b* disposed on the other side of the transfer belt 3*a* opposite a secondary transfer roller 5 and a driving roller 3*c*. The transfer belt 3*a* faces the photosensitive drums of the process cartridges 7*n*, 7*y*, 7*m*, 7*c* at its outer surface. Primary transfer rollers Fn, Fy, Fm, and Fc are disposed on the inner side of the transfer belt 3*a* at positions corresponding to the photosensitive drums Dn, Dy, Dm, and Dc. Also, the secondary transfer roller 5 is disposed as a transfer unit at a position facing the secondary transfer opposing roller 3*b*. A transfer nip 5*n* between the secondary transfer roller 5 and the transfer belt 3*a* is a transfer unit (secondary transfer unit) that transfers the toner image from the transfer belt 3*a* to the printing material P.

Fixing Process

The image heating device 6 that functions as a fixing unit fixes the toner image formed on the printing material P as a permanent image by heat melting and pressing the toner image. The image heating device 6 is a thermal fixing system fixing device that internally includes a halogen heater 6*a* as a heat source, a fixing member 6*b* as a heat roller that is heated, and a pressing member 6*c* as a pressing roller. The heat of the fixing member 6*b* may be from a ceramic heat used as a heat source or an induction heating system heat-generating mechanism. The fixing member 6*b* may use polyimide resin or polyamideimide resin as a high heat resistant resin and may be a metal such as stainless steel as a film formed on a thin film.

The heat roller is rotated by a non-illustrated drive unit such as a motor and is pressed against the pressing roller by a biasing member such as a spring to form the fixing nip 6*n* between the heat roller and the pressing roller. In the heat roller, the power supplied to the halogen heater is adjusted by a control unit so that a detected temperature of a thermistor, which is a temperature detecting element in contact with the non-illustrated surface of the heat roller, becomes a predetermined value.

Operations when Forming Images

When a printing instruction in conjunction with image data to be printed is input to the image forming apparatus 1, the control unit (not illustrated) of the image forming apparatus 1 conveys the printing material P and starts a sequence of operations (image forming operations) for forming the image on the printing material P. In the image forming operations, the printing material P is fed one at a time from the cassette 8, passed through the conveyance roller pair 8*b*, and conveyed to the transfer nip 5*n*.

In parallel with feeding the printing material P, the process cartridges 7*n*, 7*y*, 7*m*, and 7*c* are driven in order and the photosensitive drums Dn, Dy, Dm, and Dc are rotationally driven. The surfaces of the photosensitive drums Dn, Dy, Dm, and Dc that are rotationally driven are applied with a uniform charge via a non-illustrated charging roller. Also, the scanner unit 2 forms electrostatic latent images on the photosensitive drums by emitting laser light modulated on the basis of the image data at the photosensitive drums Dn, Dy, Dm, and Dc.

The toner stored in each process cartridge 7*n*, 7*y*, 7*m*, 7*c* is carried by a non-illustrated developing roller and is developed as a toner image, which is a visible image, corresponding to the electrostatic latent image formed on the respective photosensitive drum Dn, Dy, Dm, Dc. Note that the bonding toner Tn image formed on the photosensitive drum Dn by the bonding toner Tn is different from the toner images (normal toner images) of the image toner for printing images such as text and graphics on the printing material P in that its purpose is not to transfer visual information. However, hereinafter, in order to form a bonding toner Tn image in a predetermined pattern on the printing material P, the bonding toner Tn image developed by the electrophotographic process will also be treated as one of the toner images.

The transfer belt 3*a* rotates in the anticlockwise direction (arrow) in the diagram. The toner image formed by each process cartridge 7*n*, 7*y*, 7*m*, 7*c* is transferred (primary transfer) from the photosensitive drum to the transfer belt 3*a* via an electrical field formed between the photosensitive drum Dn, Dy, Dm, Dc and the primary transfer roller Fn, Fy, Fm, Fc. The toner image that is carried on the transfer belt 3*a* and arrives at the transfer nip 5*n* is transferred (secondary transfer) to the printing material P fed and conveyed from the cassette 8 via an electrical field formed between the secondary transfer roller 5 and the secondary transfer opposing roller 3*b*.

Thereafter, the printing material P is conveyed to the image heating device 6 and subjected to thermal fixing processing. In other words, the toner image on the printing material P when the printing material P passes through the fixing nip 6*n* is heated and pressed. This melts the image toner image and the bonding toner Tn image and thereafter sticks them to fix a permanent image on the printing material P.

An inverting flapper 21 installed downstream of the fixing nip 6*n* in the conveyance direction of the printing material P is a guide member for switching the conveyance direction of the printing material P. The inverting flapper 21 switches the conveyance direction of the printing material P according to the print mode selected from among the single-sided print mode for forming an image on only one side of the printing material P and the double-sided print mode for forming an image on both sides of the printing material P.

For example, in the case of the single-sided print mode, the inverting flapper 21 conveys the printing material P to a discharge roller pair 22 side. In this manner, the sequence of image forming operations in the image forming apparatus 1 ends, the printing material P arrives at a booklet manufacturing apparatus 4, functioning as a post-processing apparatus, via an intermediate conveyance unit 26 including an intermediate conveyance unit conveyance roller pair 24 and 25.

The booklet manufacturing apparatus 4 described in the present embodiment is a floor-standing type and includes a booklet manufacturing unit 50 including at a lower portion a printing material P aligning unit and a thermocompression bonding member 61 (see FIG. 3) that heats and applies pressure to an aligned stack of printing material P for a predetermined amount of time.

In the case of the double-sided print mode, the printing material P with an image formed on one side (hereinafter referred to as the front surface) is conveyed to a switch-back roller pair 23 by the inverting flapper 21. The switch-back roller pair 23 conveys the printing material P to a double-sided conveying path 27 side for double-sided printing by reversing the rotation direction after the printing material P has been discharged up to the trailing end. The printing material P conveyed to the double-sided conveying path 27 passes through a secondary transfer unit and a fixing device 6 again so that an image is formed on the surface (hereinafter referred to as the back surface) of the printing material P where an image is not formed, thus forming an image on both sides of the printing material P. The printing material P with an image formed on both sides is conveyed to the discharge roller pair 22 side by the inverting flapper 21. In this manner, the sequence of image forming operations in the image forming apparatus 1 ends, and the printing material P is conveyed to the booklet manufacturing apparatus 4 via the intermediate conveyance unit 26.

Printing Material Conveying by Booklet Manufacturing Apparatus

Next, the operations of the booklet manufacturing apparatus 4 will be described. The image forming apparatus 1 and the booklet manufacturing apparatus 4 are collectively referred to as a booklet manufacturing system. The printing material P conveyed from the intermediate conveyance unit 26 passes through a rear discharge inlet conveyance roller pair 30 and a rear discharge first conveyance roller pair 31 of the booklet manufacturing apparatus 4, then passes through a discharge/reversing roller pair 32, and is discharge to a discharge upper tray 33. In a case where the discharge destination of the printing material P is a discharge lower tray 34, an inverting flapper 35 switches at the time when the trailing end of the printing material P passes the inverting flapper 35. After the rotation of the discharge/reversing roller pair 32 is simultaneously stopped, rotation is reversed. This switches back the printing material P and conveys it to a rear discharge second conveyance roller pair 36. The printing material P conveyed from the rear discharge second conveyance roller pair 36 passes through a rear discharge third conveyance roller pair 37 and is conveyed to a rear discharge final conveyance roller pair 38. At a predetermined timing when the trailing end of the printing material P passes the rear discharge third conveyance roller pair 37, the rear discharge final conveyance roller pair 38 is stopped before the rotation is reversed. This conveys the printing material P to a booklet discharge roller pair 39 and discharges it from a booklet discharge opening 40 to the discharge lower tray 34. In the case of manufacturing a booklet, as described in the booklet manufacturing section below, the printing material P is conveyed to an intermediate stacking unit 51 inside the booklet manufacturing apparatus 4 by the rear discharge final conveyance roller pair 38 where the stack is bound as a booklet. The intermediate stacking unit 51 may be simply referred to as a stacking unit.

Booklet Manufacturing

Next, a booklet manufacturing unit 50 will be described. The printing material P manufactured as a booklet passes through the rear discharge third conveyance roller pair 37, is conveyed to the rear discharge final conveyance roller pair 38, and then is conveyed to the intermediate stacking unit 51 inside the booklet manufacturing apparatus 4. A horizontal aligning reference plate 52 is disposed at the most downstream portion of the intermediate stacking unit 51, where the printing material P is aligned as a stack by the end portion of the printing material P hitting the horizontal aligning reference plate 52.

The printing material P alignment method will now be described using FIGS. 2A and 2D. The height direction which is the conveyance direction of the printing material P is the X direction, and the width direction is the Y direction.

Figure 2A:
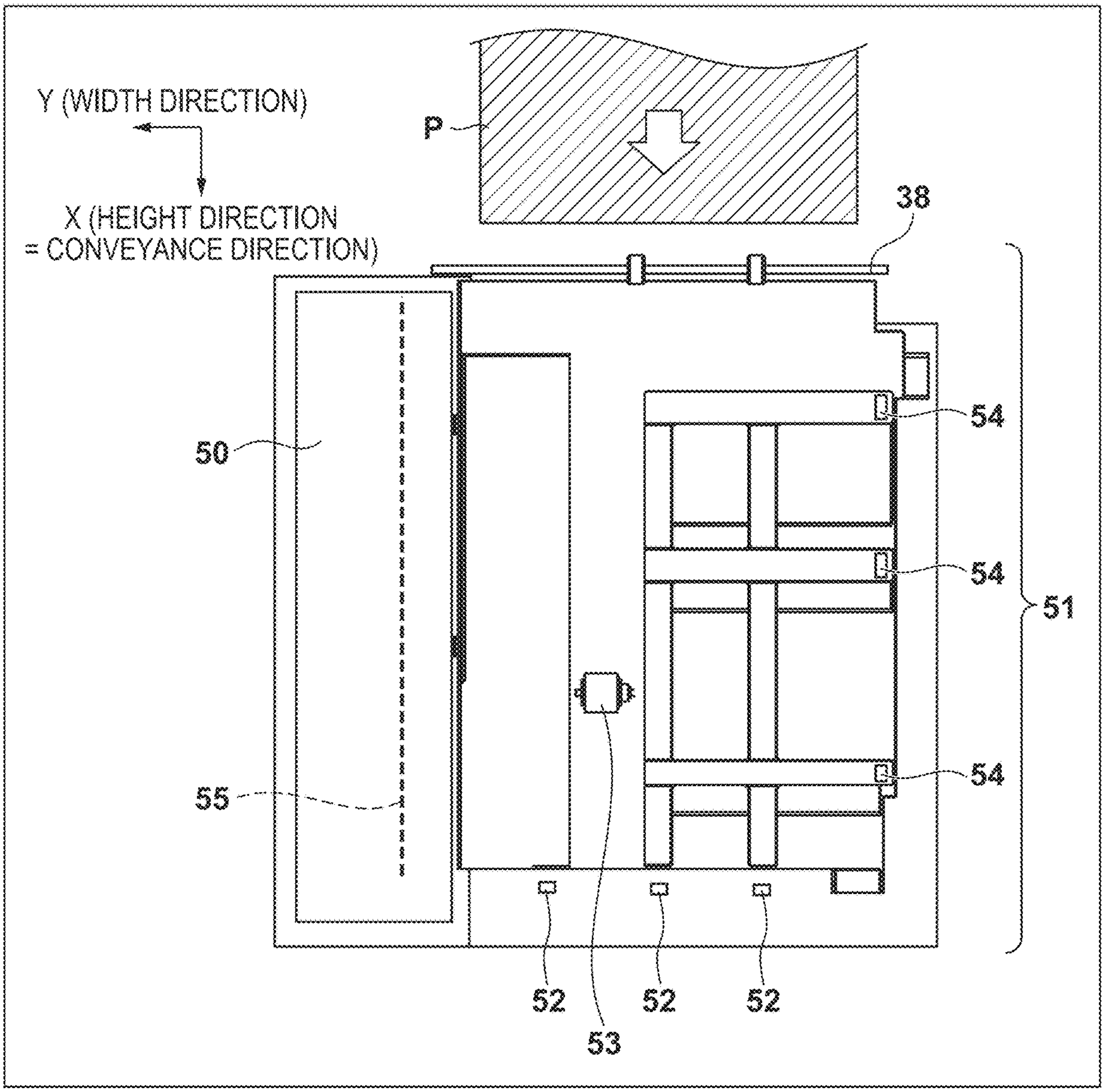
FIG. 2A is a top view of a booklet manufacturing apparatus used in an embodiment of the present disclosure.

(a) The printing material P is conveyed to the intermediate stacking unit 51 (FIG. 2A).

Figure 2B:
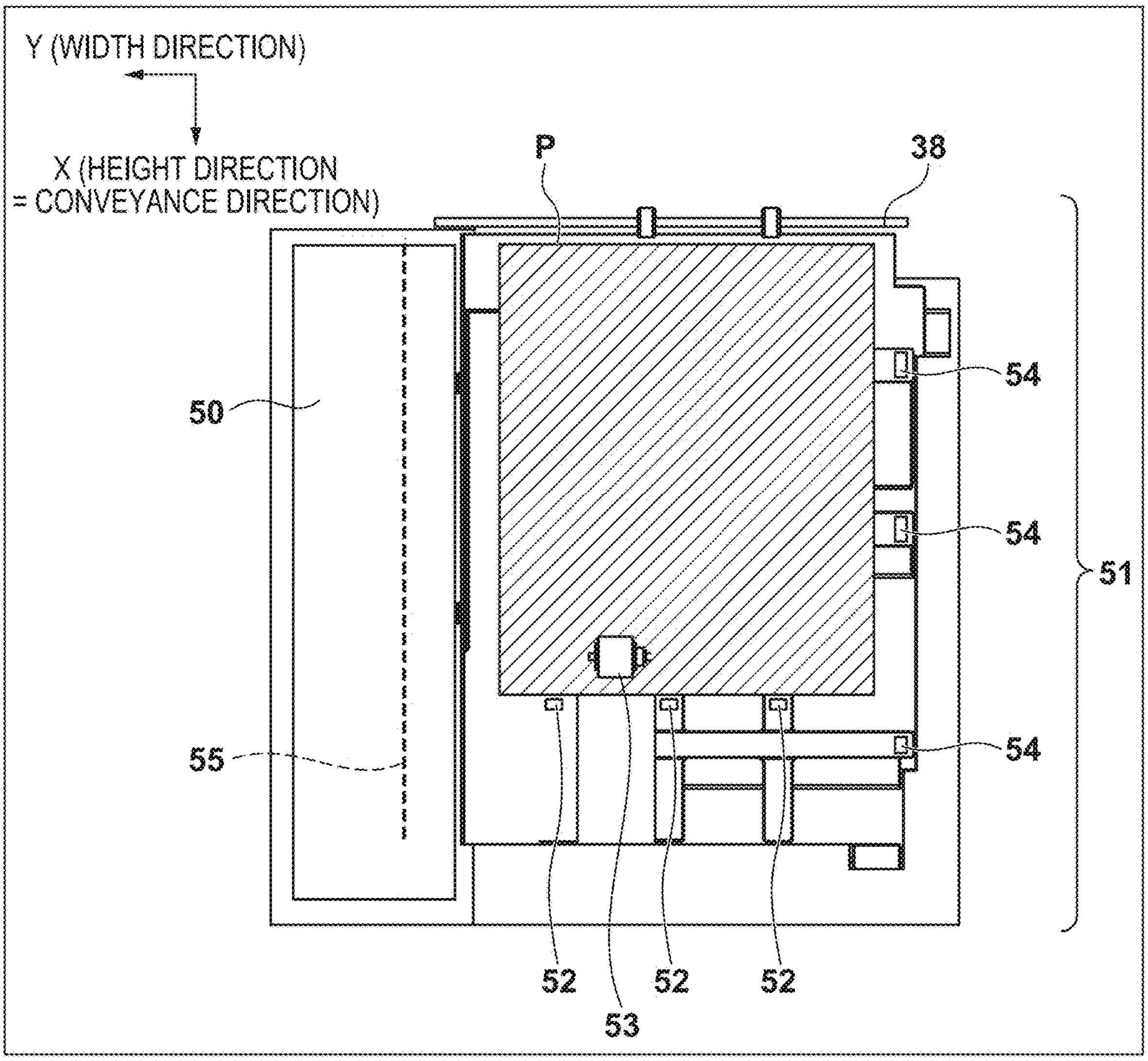
FIG. 2B is a top view of a booklet manufacturing apparatus used in an embodiment of the present disclosure.

(b) The upstream end in the conveyance direction of the printing material P stacked at the intermediate stacking unit 51 having passed the rear discharge final conveyance roller pair 38 is conveyed by being hit against the horizontal aligning reference plate 52 by an alignment roller 53 (FIG. 2B).

Figure 2C:
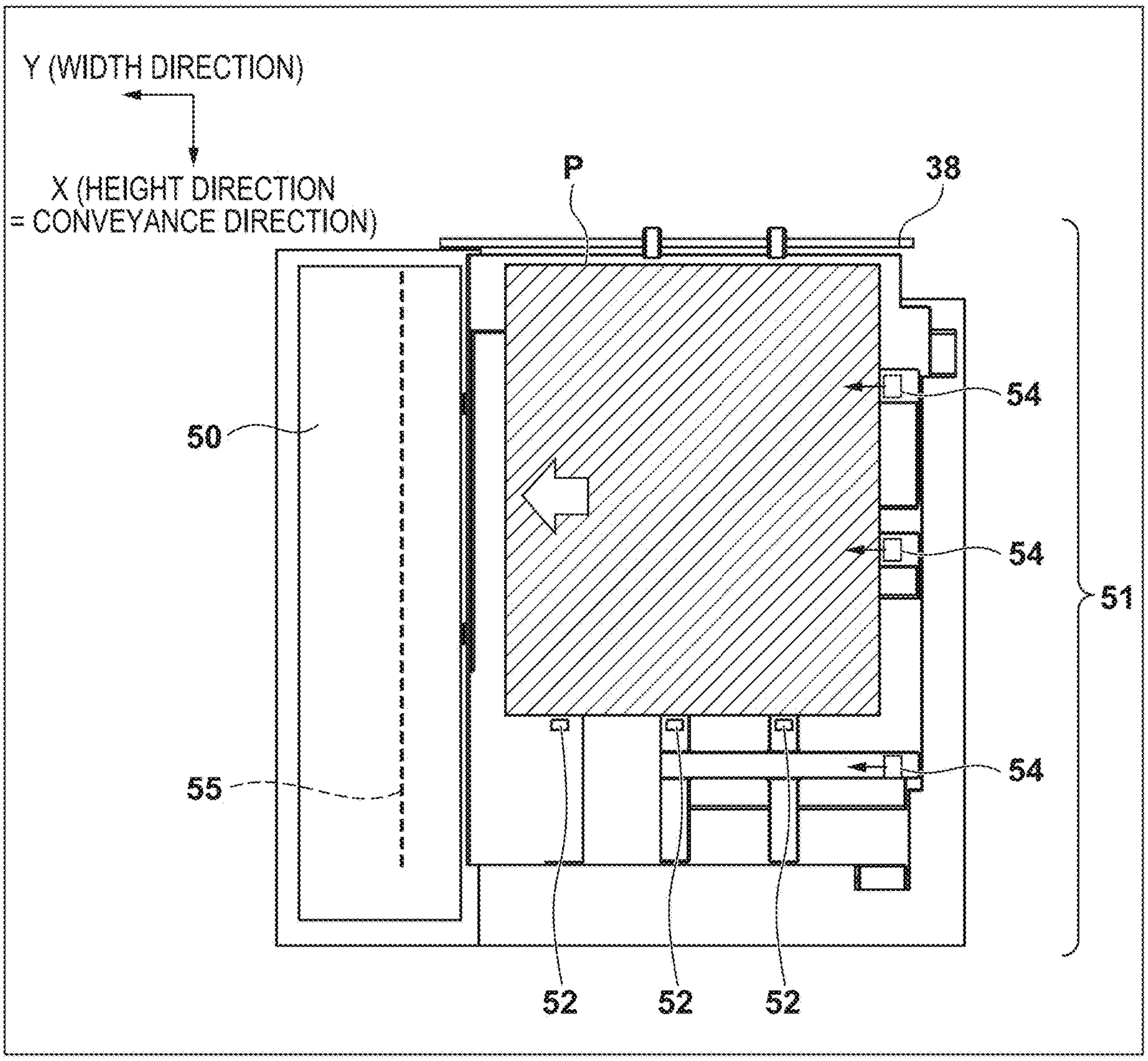
FIG. 2C is a top view of a booklet manufacturing apparatus used in an embodiment of the present disclosure.

(c) The printing material P hit against the horizontal aligning reference plate 52 is pressed to the left side in the diagram by a vertical aligning catch 54 that can move in the Y direction (FIG. 2C).

Figure 2D:
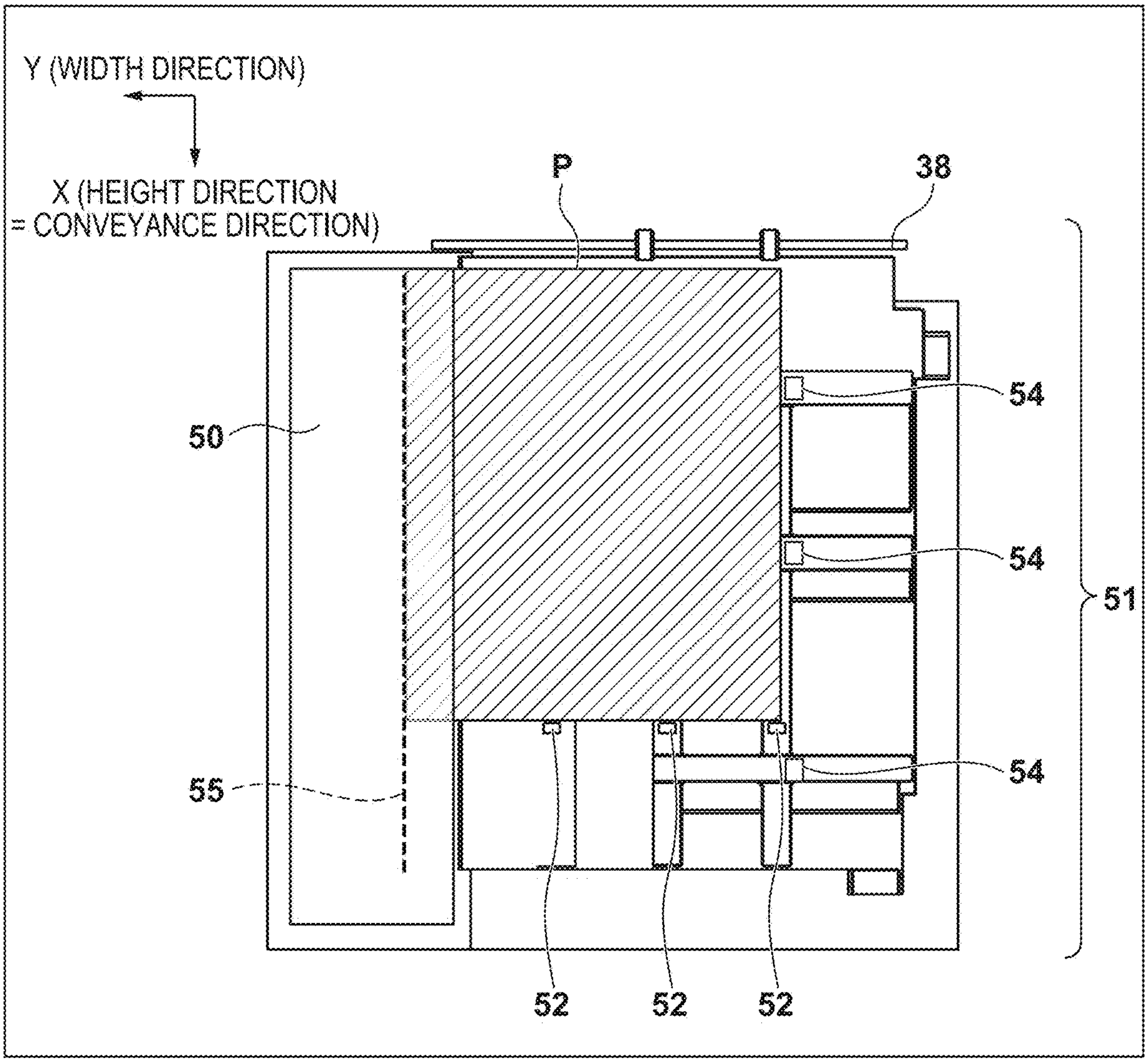
FIG. 2D is a top view of a booklet manufacturing apparatus used in an embodiment of the present disclosure.

(d) The printing material P pressed to the left side in the diagram by the vertical aligning catch 54 is hit against a vertical aligning reference plate 55 (broken line) to form a stack of the printing material P aligned with high accuracy in both the width direction and the height direction (FIG. 2D).

In this manner, after thermocompression bonding is performed to heat and pressing the aligned stack of printing material P at the thermocompression bonding member 61, the bonding toner Tn images become a bonding agent and bond together the printing materials P so that the stack forms one booklet.

Thermocompression Bonding

Figure 3:
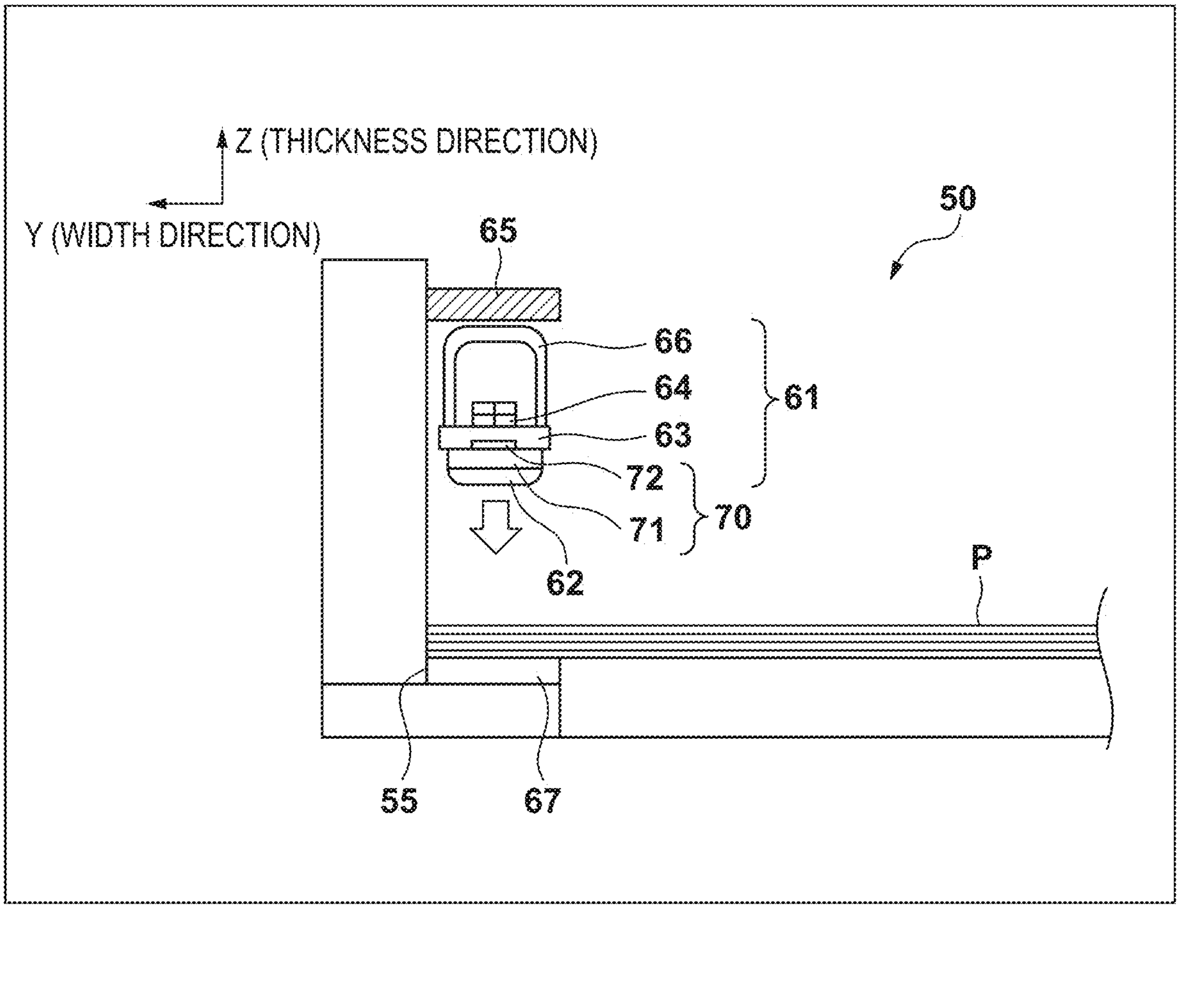
FIG. 3 is a diagram illustrating the configuration of a thermocompression bonding member used in an embodiment of the present disclosure.

The thermocompression bonding member 61 will now be described. FIG. 3 is a cross-sectional overall view of the thermocompression bonding member 61. The thermocompression bonding member 61 includes a first pressure plate 62 made of aluminum and with a thickness of 2.5 mm disposed on a ceramic heater 70 functioning as a heat source and provided with a heat generating body 72 on a ceramic base 71 with a thickness of 1.0 mm. With this configuration, low heat capacity can be realized to thus reduce power consumption.

The first pressure plate 62 has a length corresponding to the maximum size or greater that a booklet can be made by the image forming apparatus 1 and the booklet manufacturing apparatus 4 according to the present embodiment. The first pressure plate 62 extends in the depth direction of FIG. 3, and the size in this direction is the length. In the present example, the length of the first pressure plate 62 is 300 mm, the length that the A4 sized printing material P can be bonded. For the first pressure plate 62 to heat uniformly, the length of the heat generating body 72 of the ceramic heater 70 is a length greater than end-to-end of the first pressure plate 62. In the present embodiment, the length of the heat generating body 72 is 320 mm. The base of the heat source can be a rigid body such as a metal instead of ceramic.

For the first pressure plate 62, a material with low heat capacity and high thermal conductivity for efficiently transferring heat from the heat source and an elastic modulus of 1000 Pa or greater to prevent deformation due to pressing forces during thermocompression bonding is suitable, and preferably a material with a high elasticity of 10000 Pa or greater is optimally used.

The ceramic heater 70 makes the surface temperature of the first pressure plate 62 a temperature at which thermocompression bonding can be performed by a temperature detected by a thermistor 64 functioning as a temperature detecting unit supported by a heat support 63 being controlled to the target thermocompression bonding control temperature. The heat support 63 supporting the ceramic heater 70 is formed of a material such as a liquid crystal polymer, which is an example of a high heat resistant functional resin.

A pressing lever 65 pushes the thermocompression bonding member 61 down in the down direction of the diagram and presses the printing material P stack. The pressing lever 65 is operated via the operation of a non-illustrated drive source. The pressing force from the pressing lever 65 transfers through a metal stay 66 functioning as a rigid body to the first pressure plate 62, sandwiching the stack of conveyed printing material P between the first pressure plate 62 and a second pressure plate 67 (hereinafter also referred to as a pressing member) and pressing them together. The second pressure plate 67 functioning as a pressing member is a plate-like member made of silicone rubber with a thickness of 2.0 mm. The second pressure plate 67 is a member for stably transferring the pressing force from the pressing lever 65 to the printing material P stack. A material other than silicone rubber can be used for the second pressure plate 67 as long as the material has a certain amount of deformability with an elastic modulus of 1000 Pa or less, is resistant to repeat stress, and has heat resistance to function as a member for stably transferring the pressing force to the printing material P stack.

At the portion of the printing material P to be pressed where the surface in contact with other printing material is pressed, a toner image (also referred to as a bonding toner image or bonding agent image) is formed from the bonding toner Tn by the image forming apparatus 1. Thus, the bonding toner image does not need to be formed on the surface corresponding to the front page and the back page of the booklet of the first sheet and the last sheet of the booklet. Also, the formation of the bonding toner image may be limited to at least one printing material from among two in-contact printing materials P. In this manner, by forming the bonding toner image, the stack of printing material heated and pressed are bounded by the bonding toner. The bonding toner image is formed at a predetermined portion of the printing material P according to the binding method of line binding, corner binding, or the like.

The number of printing material P to subjected to thermocompression bonding is preferably set as appropriate taking into account the amount of time needed for thermocompression bonding and the productivity of booklet manufacture. In the embodiment described here in the present specification, five of the printing materials P are stacked and aligned as a stack to be subjected to thermocompression bonding. In thermocompression bonding, the printing material P stack is put in a state with the temperature of the first pressure plate 62 being the target temperature for thermocompression bonding and pressed for 2 seconds. Thereafter, the first pressure plate 62 and the stack of the printing materials P are separated. This ends the booklet manufacture using a thermocompression bonding process.

For example, a booklet made of 50 printing materials P is manufactured using a process like the following.

The first thermocompression bonding is performed on a predetermined number, for example, 1st to 5th, of printing materials P to manufacture a booklet made of five printing materials P. Here, the booklet is formed by adding a predetermined number of sheets at a time, and a booklet still in the process of being made is referred to as a temporary booklet. Also, hereinafter, in the case of indicating the ordinal number of the printing material P, this will be expressed via the stacked order in the intermediate stacking unit 51. This order is the image formation order and corresponds to the order starting counting from the front cover of the booklet.

The second thermocompression bonding is performed on the 6th to 10th printing material P stacked on top of the temporary booklet made from five printing materials P completed first. In this manner, a temporary booklet made of ten printing materials P is manufactured.

The third thermocompression bonding is performed on the 11th to 15th printing material P stacked on top of the temporary booklet made from ten printing materials P completed first. In this manner, a temporary booklet made of 15 printing materials P is manufactured.

The fourth thermocompression bonding is performed on the 16th to 20th printing material P stacked on top of the temporary booklet made from 15 printing materials P completed first. In this manner, a temporary booklet made of 20 printing materials P is manufactured.

By repeating this process ten times, a booklet of 50 sheets is completed. Note that the case of performing thermocompression bonding on five or fewer printing materials P, thermocompression bonding is performed on that number. Note that the predetermined number used as the unit for the temporary booklet is not limited to the value 5 used in the example described above. The number used as the unit of the temporary booklet may be an appropriate number on which thermocompression bonding can be performed using the temperature of the first pressure plate 62, the pressure at the time of compression bonding, and the like. Also, in the example described above, the manufacture of a booklet was focused on. However, image formation may be performed on the printing material P in an image forming process before booklet manufacture, and the bonding toner image using the bonding toner required for thermocompression bonding may be formed on the printing material P at this time.

Positional Relationship between Printing Material P and Ceramic Heater

The positional relationship between the printing material P aligned by the horizontal aligning reference plate 52 and the ceramic heater 70 will now be described using FIG. 4. The size of the printing material P to be formed as a booklet is selected at the discretion of the user within the limits of the booklet manufacturing apparatus and may be various sizes. In the diagrams, A4, B5, and A5 are illustrated as the various sizes of the printing material P. The position in the X direction of the printing material P regardless of size is aligned at the same reference alignment position by the horizontal aligning reference plate 52 and the position in the Y direction also is aligned at the same reference alignment position by the vertical aligning reference plate 55 for standby for thermocompression bonding. In other words, using a predetermined corner (in FIG. 4, the lower left corner) of the printing material P, which is a sheet material cut into a rectangle, as a reference point, regardless of the size of the printing material P, the printing material P is aligned at an alignment position for height and width (X and Y) for the booklet manufacturing apparatus. This also applies to printing material with a size that is not ISO-compliant such as letter size and legal size.

In this manner, the alignment position of the printing material P to be subjected to thermocompression bonding is the same position regardless of size. By setting the reference position of the ceramic heater 70 to the horizontal aligning reference plate 52 where the printing material P is on standby and the side where the vertical aligning reference plate 55 is located as the reference position, the adhesiveness at the end portion of the printing material P of various sizes can be ensured.

Bonding Configurations

Figure 5A:
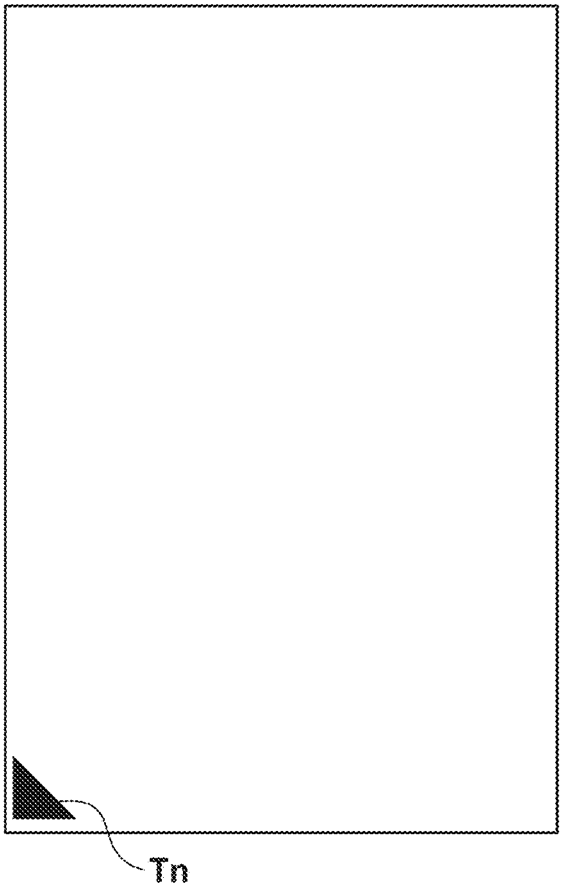
FIG. 5A is a diagram illustrating an example of a bonding toner image used in an embodiment of the present disclosure.
Figure 5B:
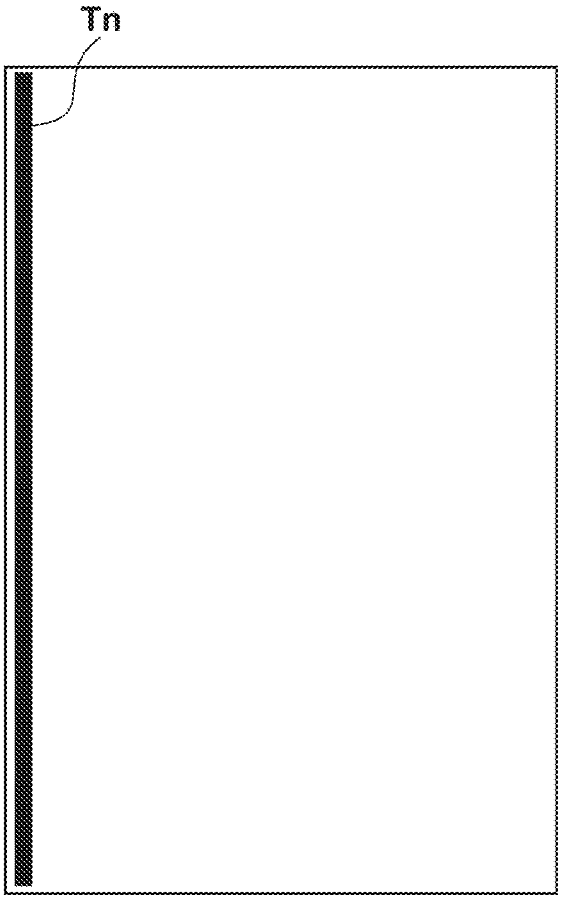
FIG. 5B is a diagram illustrating an example of a bonding toner image used in an embodiment of the present disclosure.

Examples of bonding configurations with different patterns for the bonding toner Tn image formed on the printing material P will be described using FIGS. 5A and 5B. FIG. 5A illustrates a booklet bonding configuration in which the corner portion is bonded via a corner fastener by forming the bonding toner Tn image in the corner portion of the printing material P. FIG. 5B illustrates a booklet bonding configuration in which the edge portion is bonded via an edge fastener by forming the bonding toner Tn image along the long side edge on the left side of the printing material P. In a case where a booklet of n pages is manufactured, except for the first surface of the first page corresponding to the front cover, the bonding toner Tn image is formed on both surfaces corresponding to facing surfaces when all the printing materials P to the n-th page are aligned. The booklet is then manufactured by performing thermocompression bonding five pages at a time as described above. In the example illustrated in FIGS. 5A and 5B, the bonding toner Tn image formed on the printing material P is formed on both surfaces. However, it may be formed only on one surface of the printing material P. Whether the bonding toner Tn image is formed on one surface or both surfaces may be determined taking into account the booklet manufacturing apparatus, the bonding toner, the type of printing material, the functions required for the booklet, and the like. For example, in a case where printing material P is for a special issue booklet, a thick paper for a front cover of a booklet, a special printing material P, or the like, the bonding toner Tn image is formed on both surfaces to ensure adhesiveness. On the other hand, in a case where the booklet is a simple booklet for temporary use, the bonding toner Tn image is formed only on one surface. These are examples, and the configuration may be selected as appropriate.

The booklet completed by such a thermocompression bonding process being repeated is pushed out as a printing material P stack by a non-illustrated stack discharge guide translating in the direction of the booklet discharge opening 40 from a standby position. The booklet discharge opening 40 is provided with the booklet discharge roller pair 39, and when the leading end of the completed booklet passes the booklet discharge roller pair 39, the stack discharge guide stops and returns to the standby position. The booklet discharge roller pair 39 that receives the completed booklet from the stack discharge guide discharges the booklet from the booklet manufacturing apparatus 4 to the discharge lower tray 34. This ends the booklet manufacturing sequence.

Bonding Strength

Figure 6A:
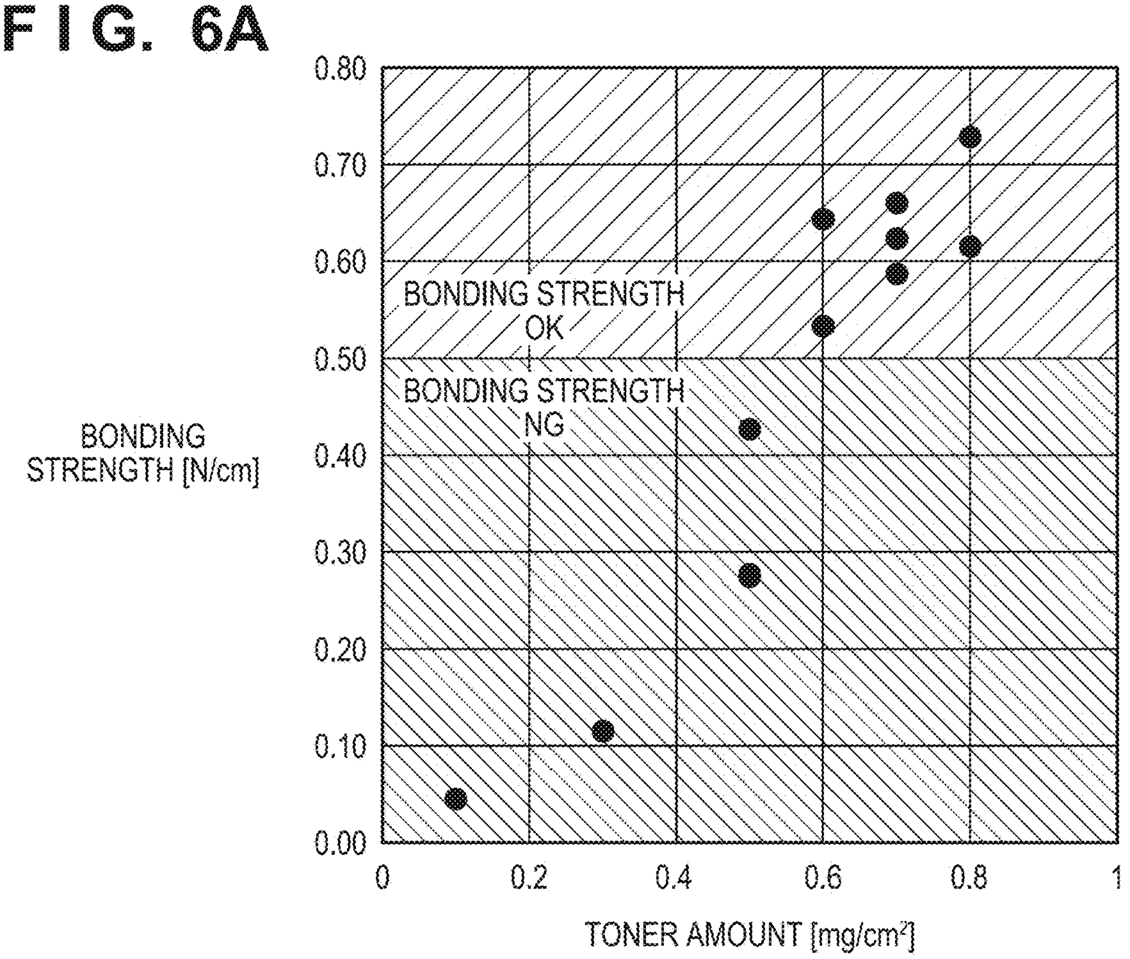
FIG. 6A is a diagram for describing the relationship between bonding strength and toner amount according to an embodiment of the present disclosure.

FIG. 6A illustrates an example of the results of measuring the relationship between the toner amount and the bonding strength of the bonding toner Tn image between the printing materials P. The bonding strength is measured as peak strength when the printing material P and the printing material P that have been subjected to thermocompression bonding separate from one another as in FIG. 6B. The toner amount indicates the toner amount per area of 1 $cm^2$ and is measured by measuring the toner amount before the bonding toner Tn image is fixed at the image heating device 6. From FIG. 6A, it can be seen that the bonding strength has a proportional relationship with the toner amount.

On the other hand, from the result of testing into the required bonding strength between the printing materials P for a completed booklet, it can be seen that a bonding strength of approximately 0.5 N/cm or greater results in the printing material P tearing and separating, from which it is determined that there is no problem with the bonding strength for a booklet. The bonding strength of 0.5 N/cm obtained in this testing was confirmed using, as the printing materials P, plain paper Office70 (70 $g/m^2$) available from Canon Marketing Japan Inc.

Figure 6B:
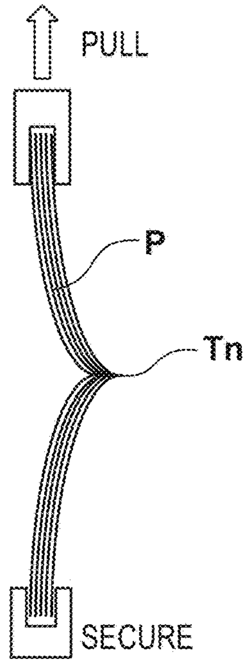
FIG. 6B is a diagram for describing the relationship between bonding strength and toner amount according to an embodiment of the present disclosure.

As illustrated in FIG. 6B, one end of any opened page of the completed booklet is secured and the other end is pulled. The bonding strength is the power at a time when the bonded printing material P and the printing material P separate. Though the bonding strength this time is confirmed for various types of the printing material P, the bonding strength is different depending on various factors including the type of the printing material P, the application of the booklet, the environment where the booklet is manufactured, and the like. Thus, the values for bonding strength are not limited to these values.

From FIG. 6A, it can be seen that the required bonding toner amount to obtain a bonding strength of 0.5 N/cm or greater is 0.6 $mg/cm^2$ or greater. Here, in the image forming apparatus 1 and the booklet manufacturing apparatus 4 described in the present embodiment, the total amount of bonding toner between bonded printing materials P is 0.6 $mg/cm^2$.

Booklet Manufacturing

Next, an example of manufacturing a booklet including a stack of 50 printing materials P will be described using FIG. 7. The back surface of the 1st printing material P is the surface corresponding to the front cover of the front (front front cover) of the completed booklet, and the bonding toner Tn image is not formed here because it is a surface that is not bonded to another printing material P. The surface of the 1st printing material P on the opposite side is a surface that is bonded to the back surface of the second printing material P, and thus the bonding toner Tn image is formed here according to the binding position. The 2nd to 5th printing materials P have the bonding toner Tn image formed on the front surface and the back surface to bond together the printing materials P. In this manner, five printing materials P with a formed bonding toner Tn image are stacked, and the bonding toner Tn images are melted by the booklet manufacturing unit 50 described above and subjected to thermocompression bonding to manufacture a temporary booklet of five pages.

Next, a temporary booklet of the 6th to 10th printing material P is manufactured. The manufacture of the temporary booklet of the 6th to 10th printing material P has a similar process as that of the temporary booklet of the 1st to 5th printing material P except for the following. The 6th printing material P is different from the first printing material P in that it is not used as the surface of the completed booklet. The bonding toner Tn image is formed on the back surface of the 6th printing material P as it is bonded to the front surface of the 5th printing material P of the booklet of the 1st to 5th printing material P completed earlier. The 6th to 10th printing materials P are stacked and aligned with the temporary booklet of the 1st to 5th printing material P completed earlier and then thermocompression bonding by the thermocompression bonding member 61 is performed. Next, in a similar manner, the 11th to 15th printing materials P are stacked and aligned and thermocompression bonding is repeated to manufacture a temporary booklet of the 1st to 15th printing material P.

In this manner, the thermocompression bonding process is repeated, and when the last 46th to 50th printing materials P are stacked and aligned and then thermocompression bonding is performed, a booklet of 50 printing materials P is completed. The front surface of the 50th printing material P correspond to the last of the 46th to 50th printing materials P is a surface correspond to a front cover (back front cover) that is not bonded with another printing material P. Thus, the bonding toner Tn image is not formed on it.

Preliminary Heating

Next, preliminary heating performed to stabilize the bonding strength will be described. In the present embodiment, the booklet is completed by repeating thermocompression bonding on every five printing materials P. The ceramic heater 70, which is the heat source that melts the bonding toner when performing thermocompression bonding on each 5 printing materials P, is brought into direct contact with the printing material P of multiples of 5, such as the 5th, 10th, 15th, and the like as illustrated in FIG. 7 and melts the bonding toner Tn images. On the other hand, of the printing materials P additively bonded to the temporary booklets, the printing material P of multiples of 5+1 such as the 1st, 6th, 11th, and the like that are separated from the ceramic heater 70 are heated via heat transfer through the four printing materials P therebetween and bonding toner Tn images. These intermediate printing materials P are fewer than four, but heat transfers to them via the interposed printing material P. Thus, the amount of heat received by the printing material P and the bonding toner Tn image of the 5th, 4th, 3rd, 2nd, and 1st in order of when they were added on top of the temporary booklet placed on the intermediate stacking unit 51 is different depending on what number in the order the printing material P is. In other words, the amount of heat received by the printing material P and the bonding toner Tn image decreases in order from the 5th, 4th, 3rd, 2nd, and 1st, and the bonding strength between the printing materials P also differs. In other words, the amount of heat received by the printing material P and the bonding toner Tn image is less the further away from the ceramic heater 70, and the bonding strength between the printing materials P is different depending on the amount of heat. Stabilizing the amount of heat received by the printing materials P is a suitable way of stabilizing the bonding strength between the printing materials P.

Instead of performing thermal bonding of each five printing materials P, if thermocompression bonding is performed to bond the printing material P and the printing material P at the minimum number of every two printing materials P, the amount of heat and the bonding strength is stabilized, but the booklet manufacturing productivity is decreased. This may lead to an increase in the amount of time required for booklet manufacture. In the present embodiment, the productivity is taken into account, and thermocompression bonding of every five printing materials P is repeated. The heat of the ceramic heater 70 which is the heat source is controlled to melt the bonding toner Tn images formed on the five printing materials P and so to provide the amount of heat to obtain reliable adhesiveness. However, there may be times when the amount of heat is insufficient.

As described above, the thermocompression bonding member 61 has an energy saving and a quick response configuration with high temperature responsiveness. Thus, the heat capacity is small. Also, for a pressing member 67, a silicone rubber is selected as an elastic body with a thermal insulation function for the amount of heat.

In this manner, the thermocompression bonding member 61 has a small heat capacity. However, in a case where the thermocompression bonding member 61 overall is a low temperature, the atmospheric environment where the booklet manufacturing process is performed is a low temperature, or the like, the amount of heat from the ceramic heater 70, which is the heat source, may have a portion escape due to heat transfer to the thermocompression bonding member 61 and the supporting components. In this case, since the pressing member 67 is also a low temperature, heat is transferred to the pressing member 67 via the printing material P, leading to there being an insufficient amount of heat for thermocompression bonding. In such a state, the amount of heat is insufficient to melt the bonding toner Tn images, and the bonding strength between the printing materials P is insufficient. In a case where the bonding strength is insufficient, the control temperature of the ceramic heater 70, which is the heat source, is set to high to ensure that the bonding toner Tn images melt and the bonding strength is obtained. However, the following problem may occur.

Figure 7:
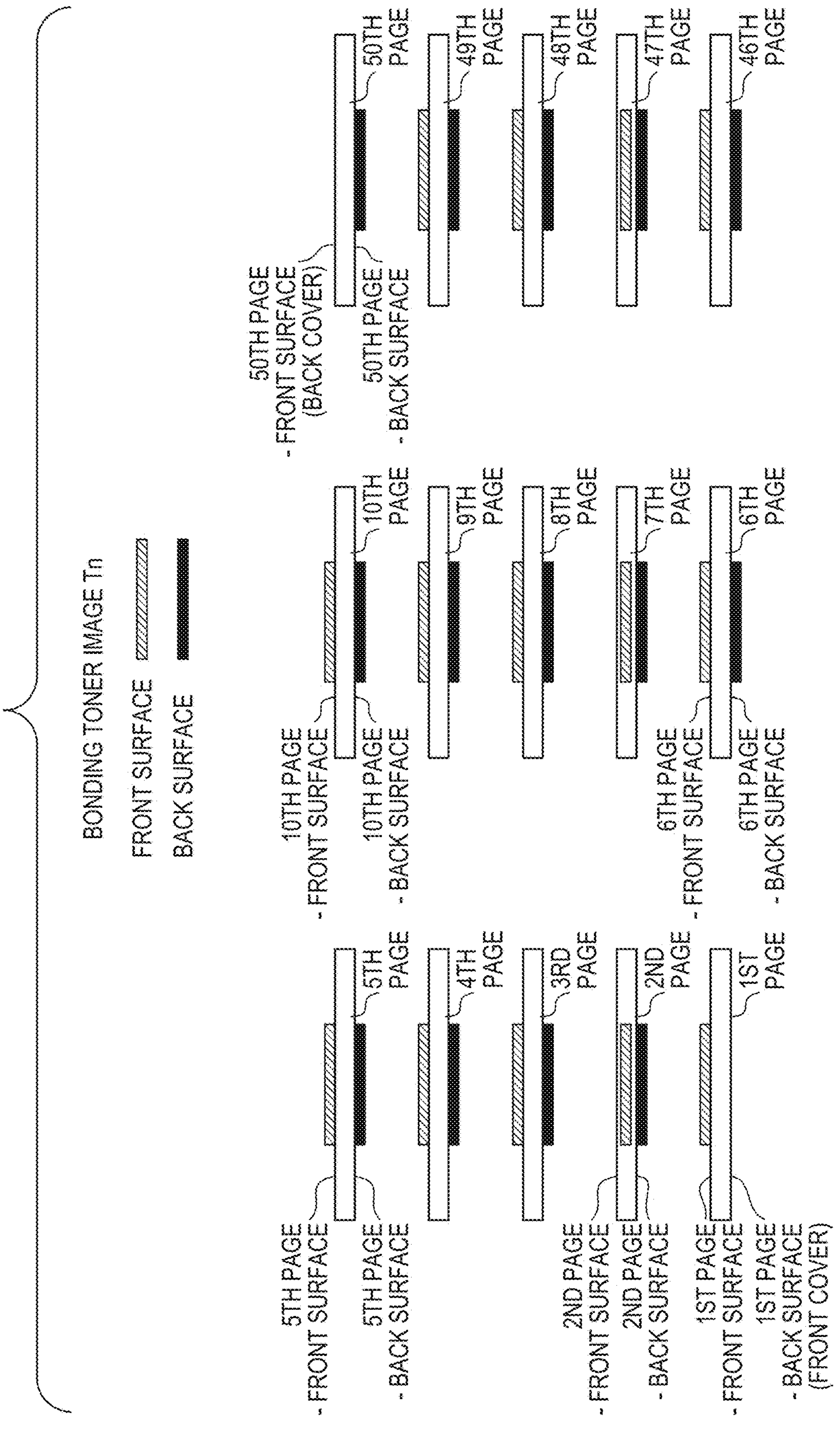
FIG. 7 is a diagram illustrating an example of a printing material P used in an embodiment of the present disclosure.

When an amount of heat sufficient to reliably melt the first and the second bonding toner Tn images illustrated in FIG. 7 is applied, the amount of heat received by the bonding toner Tn image formed on the 5th and 4th printing material P that come close to the thermocompression bonding member 61 becomes too great. Thus, the bonding toner Tn image melts beyond that suitable for bonding, and the bonding toner Tn image melts into the fiber of the printing material P. The bonding toner Tn image that melts into the fiber of the printing material P cannot contribute to bonding, leading to the bonding strength being insufficient.

To resolve this problem, an effective method is constantly maintaining the thermocompression bonding member 61 and the pressing member 67 at a certain temperature that can obtain an optimal adhesiveness. However, constantly maintaining a certain temperature is not desirable from the perspective of energy saving.

Regarding this, an effective method is performing a preliminary heating process before bonding together the printing material in which the thermocompression bonding member 61 and the pressing member 67 are raised in temperature.

The booklet manufacturing unit 50 used in the first embodiment of the present disclosure performs a preliminary heating process for stabilizing the bonding strength. The preliminary heating process increases the temperature of the pressing member 67 by bringing the thermocompression bonding member 61 with a raised temperature into contact with the pressing member 67 and performing heat control before the thermocompression bonding of the printing material P and the printing material P which is a time when there is no printing material P between the thermocompression bonding member 61 and the pressing member 67. Also, the amount of time for heating in the preliminary heat is 3 seconds. The aim is that by increasing the temperature of the thermocompression bonding member 61 and the pressing member 67 before thermocompression bonding, the amount of heat that escapes via these members is reduced, the bonding toner Tn images are reliably melted, and the bonding strength is stabilized.

Figure 8A:
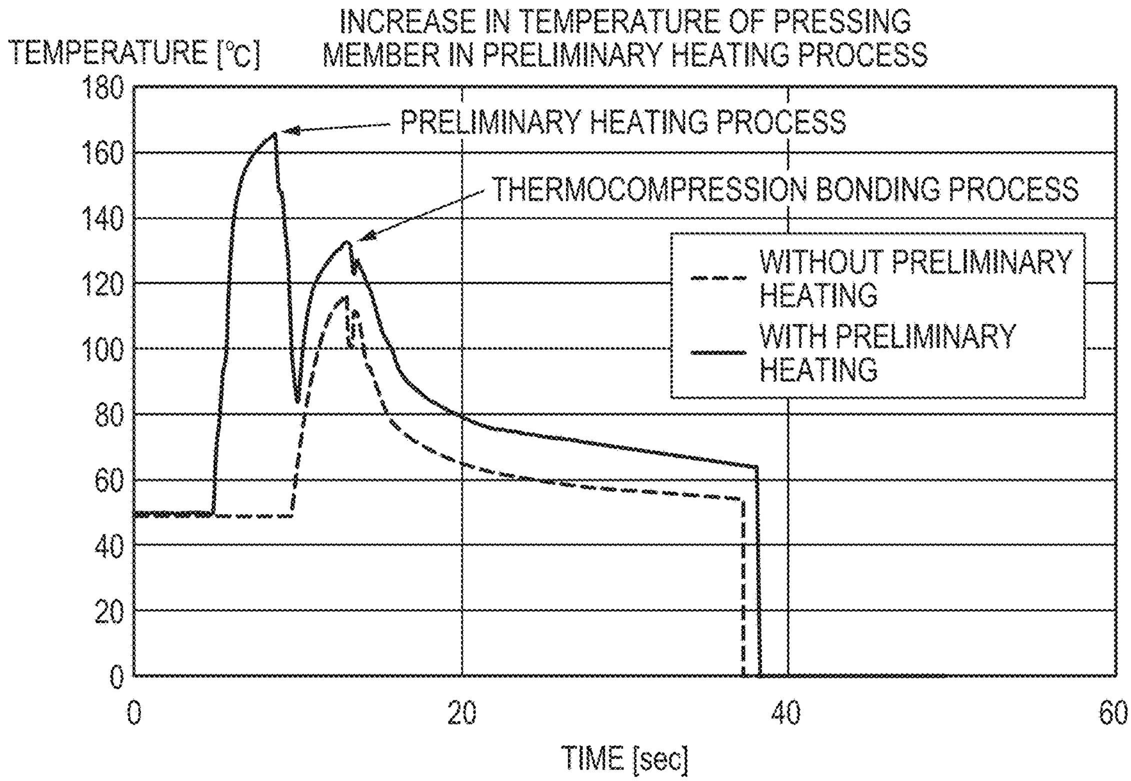
FIG. 8A is a diagram for describing preliminary heating according to a first embodiment of the present disclosure.
Figure 8B:
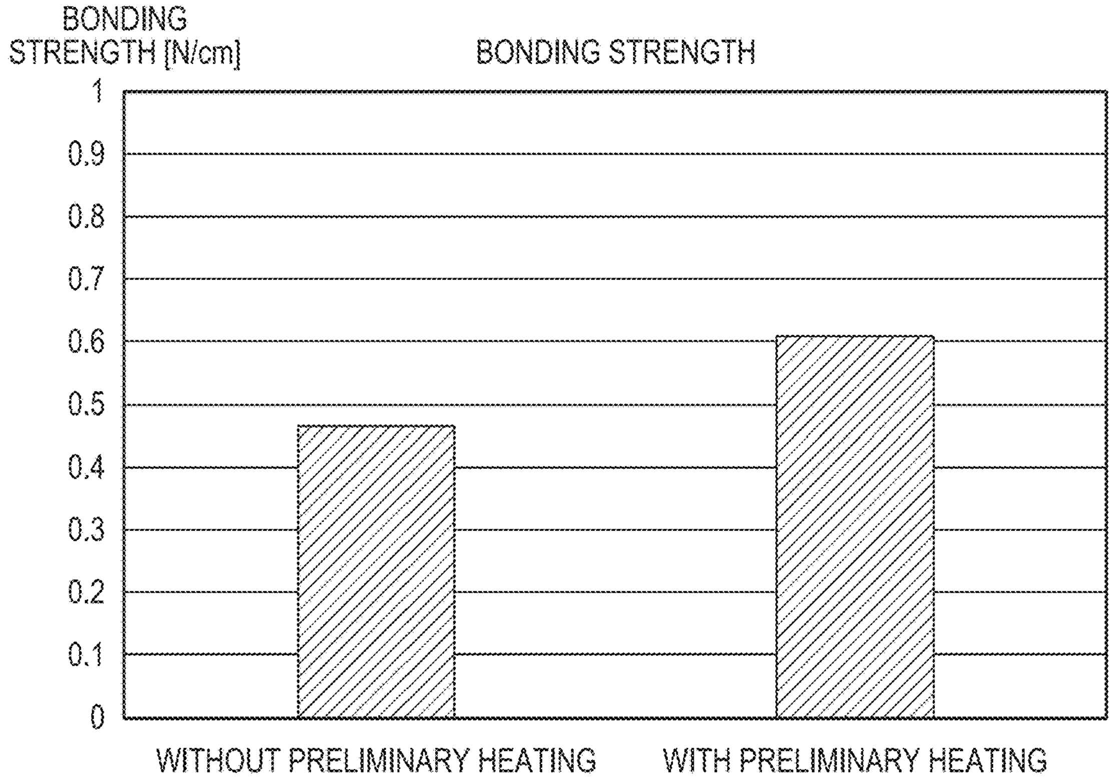
FIG. 8B is a diagram for describing preliminary heating according to the first embodiment of the present disclosure.

Next, FIGS. 8A and 8B illustrate the confirmed results of the effects of increasing the temperature of the pressing member 67 and the bonding strength in the case of performing the preliminary heating process. This confirmation is performed in an environment with an environment temperature of approximately 25° C. imitating a standard office environment.

As can be seen from FIG. 8A, when preliminary heating is performed before thermocompression bonding of the printing material P, compared to when preliminary heating is not performed, the temperature of the pressing member 67 at the time of booklet manufacture is approximately 10° C. higher. In a case where preliminary heating is not performed, the temperature of the pressing member 67 at the time of thermocompression bonding does not reach 120° C., whereas in a case where a preliminary heating of 3 seconds is performed, the temperature of the pressing member 67 increases to approximately 170° C. and is just under 130° C. at the time of thermocompression bonding. Thus, thermocompression bonding can be performed at a temperature that is approximately 10° C. higher. In the present embodiment, the preliminary heating time is 3 seconds. If this time is increased, the temperature of the pressing member 67 can be further increased. However, the productivity of the booklet manufacturing is decreased. Thus, the heating time is preferably set according to the specifications and the like of the booklet manufacturing unit 50.

The bonding strength in a case where the temperature of the pressing member 67 is approximately 10° C. higher due to the preliminary heating process is 0.6 N/cm as illustrated in FIG. 8B, which is approximately 20-30% higher, meaning that the bonding strength of 0.5 N/cm required for the booklet as described above is sufficiently ensured.

Next, before the bonding of the temporary booklet of the 6th to 10th page to be subjected to thermocompression bonding, after preliminary heating is performed in a state in which the temporary booklet of the 1st to 5th pages completed before is in the booklet manufacturing unit 50, thermocompression bonding of the temporary booklet of the 6th to the 10th page is performed. In a similar manner, adding via thermocompression bonding is repeated 5 pages at a time. In this manner, a booklet can be manufactured with stable bonding strength.

Plastic Deformation of Pressing Member

Figure 9A:
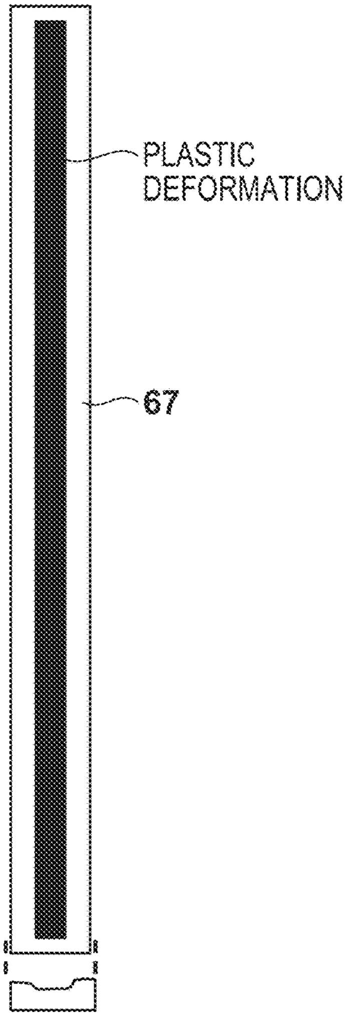
FIG. 9A is a diagram for describing a problem related to the first embodiment of the present disclosure.
Figure 9C:
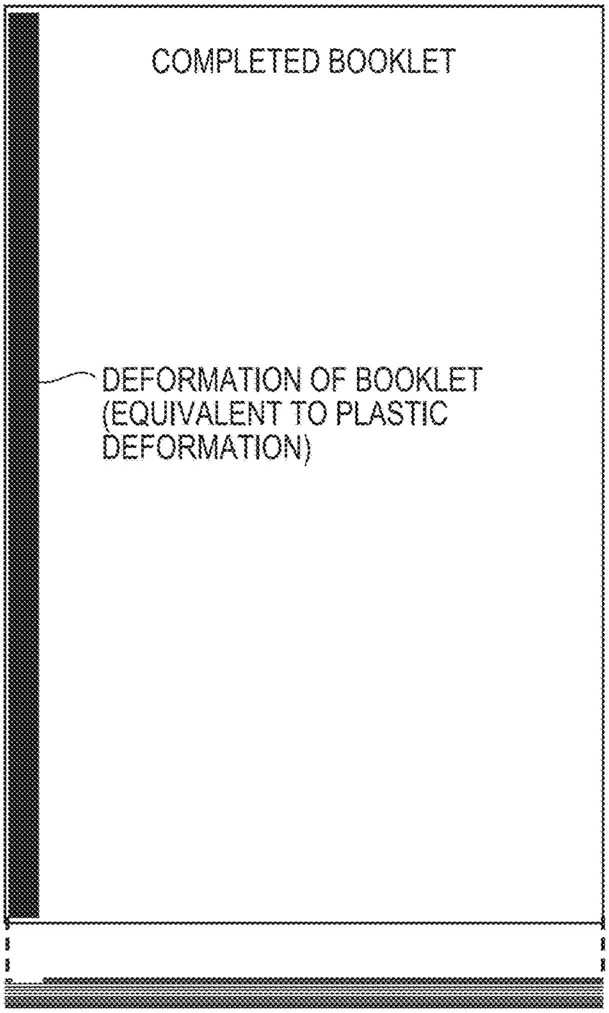
FIG. 9C is a diagram for describing a problem related to the first embodiment of the present disclosure.
Figure 9B:
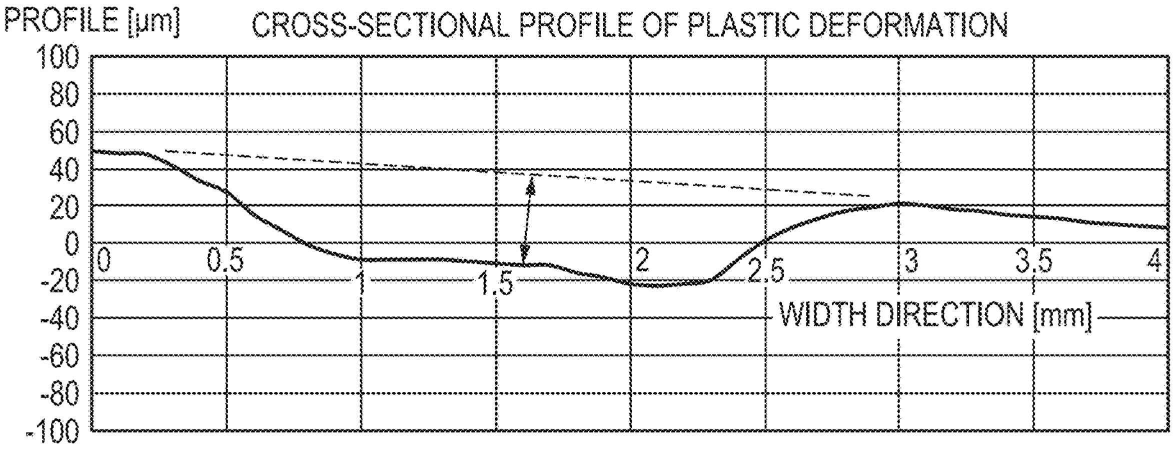
FIG. 9B is a diagram for describing a problem related to the first embodiment of the present disclosure.

Next, a phenomenon related to a problem according to the present disclosure will be described. By performing the preliminary heating process, the bonding strength between the printing materials P is stabilized, but the following problem may occur. The problem is that the pressing member 67 formed using a silicone rubber as the material with elasticity may undergo plastic deformation such as illustrated in FIGS. 9A to 9C when the preliminary heating process is repeatedly performed. Plastic deformation is a phenomenon that occurs in the portion of the pressing member 67 made of silicone rubber that comes close to the first pressure plate 62. In the present embodiment, as illustrated in FIG. 9A, plastic deformation occurs with a width of approximately 2.5 mm and a length of approximately 300 mm corresponding to the first pressure plate 62.

Plastic deformation of the silicone rubber will now be described. The heat-resistant temperature of silicone rubber changes depending on whether or not various additives are added as well as the amount and type. However, a standard silicone rubber has a heat-resistant temperature of approximately 220° C. The preliminary heating is a process of repeatedly increasing the temperature of the pressing member 67 by bringing the thermocompression bonding member 61 with an increased temperature into contact with the pressing member 67. Thus, the elasticity, a characteristic of rubber, may degraded even if the temperature is not greater than the heat-resistant temperature of the silicone rubber, causing a decrease in the elasticity. When the limit of retaining elasticity as rubber is exceeded, even if the deforming force applied as the pressing force is released, the rubber does not return to its original state from the state of being deformed by pressure, resulting in plastic deformation.

FIG. 9B illustrates an example of measurements of the shape of the silicone rubber after plastic deformation. The horizontal axis in the diagram represents the short side direction of the long side direction central portion of the pressing member 67, and the vertical axis represents the amount of recess deformation in the silicone rubber surface. It can be seen from FIG. 9B that a plastic deformation of approximately 2.5 mm in width and an average of approximately 50 μm in the depth direction has occurred. When bonding is performed using the pressing member 67 that has undergone plastic deformation, the bonding portion of the printing material P as illustrated in FIG. 9C may deform, causing a decrease in the quality of the completed booklet. In the present embodiment, it can be seen that when approximately 30 μm is exceeded for the depth of the plastic deformation illustrated in FIG. 9B, the printing material P is deformed, causing a decrease in the quality of the completed booklet.

The preliminary heating process is a process different from the thermocompression bonding in which the pressing member 67 is heated and pressed in a state where the printing material P is not present. Thus, degradation in the silicone rubber may quickly occur, and the time until plastic deformation occurs may be shorter. In other words, it is found that the number of times that booklet manufacturing can be performed is decreased and the service life of the booklet manufacturing unit 50 is decreased.

Present Disclosure Advantage

The booklet manufacturing apparatus according to the present embodiment includes the booklet manufacturing unit 50. With the booklet manufacturing unit 50, by performing both the preliminary heating process to obtain a stable bonding strength and control of plastic deformation of the pressing member 67 made of silicone rubber, the booklet manufacturing unit 50 can be used for a long period of time without a decrease in the quality of the completed booklet.

In a case where thermocompression bonding is repeated and a booklet of 50 pages is manufactured, the following changes occur in the thermocompression bonding member 61.

As described above, the heated thermocompression bonding member 61 is directly pressed again the pressing member 67 to perform preliminary heating. Also, however, preliminary heating may be performed by pressing the heated thermocompression bonding member 61 against a temporary booklet placed on the intermediate stacking unit 51 having finished compression bonding. In the present embodiment, after performing preliminary heating, thermocompression bonding of the 1st to 5th pages is performed, and before the 6th printing material P of the temporary booklet of the 6th to 10th pages to be manufactured is conveyed to the booklet manufacturing unit 50, preliminary heating is performed with the temporary booklet of the 1st to 5th pages completed earlier in the booklet manufacturing unit 50. Thereafter, thermocompression bonding of the 6th to 10th pages is performed. Then, in a similar manner, thermocompression bonding of the temporary booklet of the 11th to 15th pages is performed, and thermocompression bonding is repeated on the following printing material P stack. In this manner, a booklet of the desired number of pages, for example, 50 pages, with stable bonding strength can be completed.

When the preliminary heating process and the thermocompression bonding process are repeated to manufacture a booklet, the temperature of the pressing member 67 increases. Also, since a manufacture-in-progress temporary booklet is present in the booklet manufacturing unit 50, the atmosphere around the booklet manufacturing unit 50 also increases in temperature, meaning that the amount of heat that escapes via the thermocompression bonding member 61 and the pressing member 67 is decreased. This makes the bonding strength stable.

By manufacturing the booklet in this manner, the bonding strength is made stable, decreasing the need for stabilizing the bonding strength with the preliminary heating process. In the example described above, a booklet of 50 pages is manufactured. However, the same applies to an example in which a booklet of two pages, the minimum for performing thermocompression bonding, is repeatedly manufactured.

On the other hand, when the repeated thermocompression bonding is complete and booklet manufacture has stopped for a long amount of time, the temperature of the thermocompression bonding member 61 and the pressing member 67 decreases, leading to a state in which a stable bonding strength cannot be obtained as described above. When the booklet manufacturing unit 50 has changed to this state, it is necessary to again perform the preliminary heating process.

Thus, in the present embodiment, in a case where a stable bonding strength can be obtained without perform the preliminary heating process to increase the temperature of the pressing member 67, the preliminary heating process is not performed (is stopped) to prevent plastic deformation of the silicone rubber of the pressing member 67.

Figure 10A:
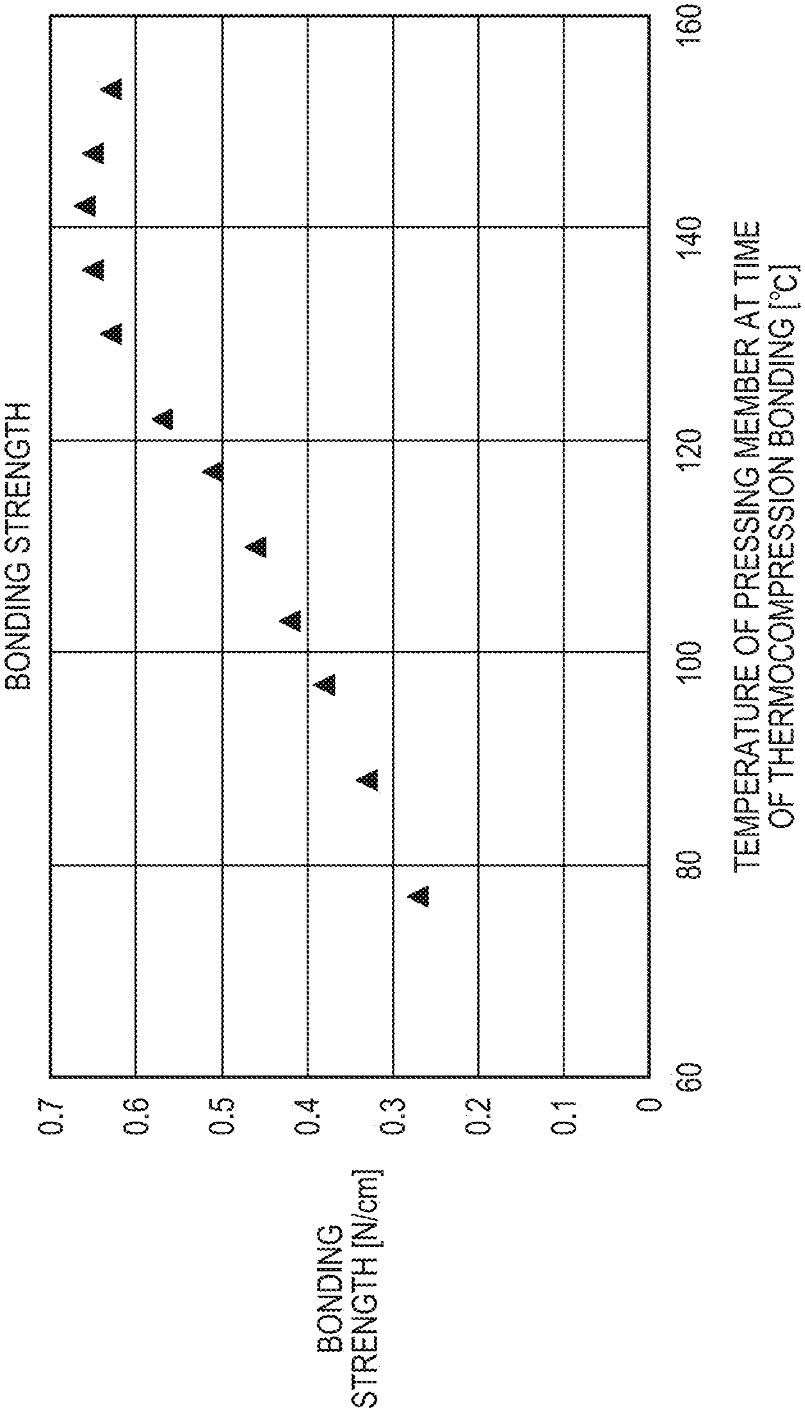
FIG. 10A is a diagram for describing the first embodiment of the present disclosure.
Figure 10B:
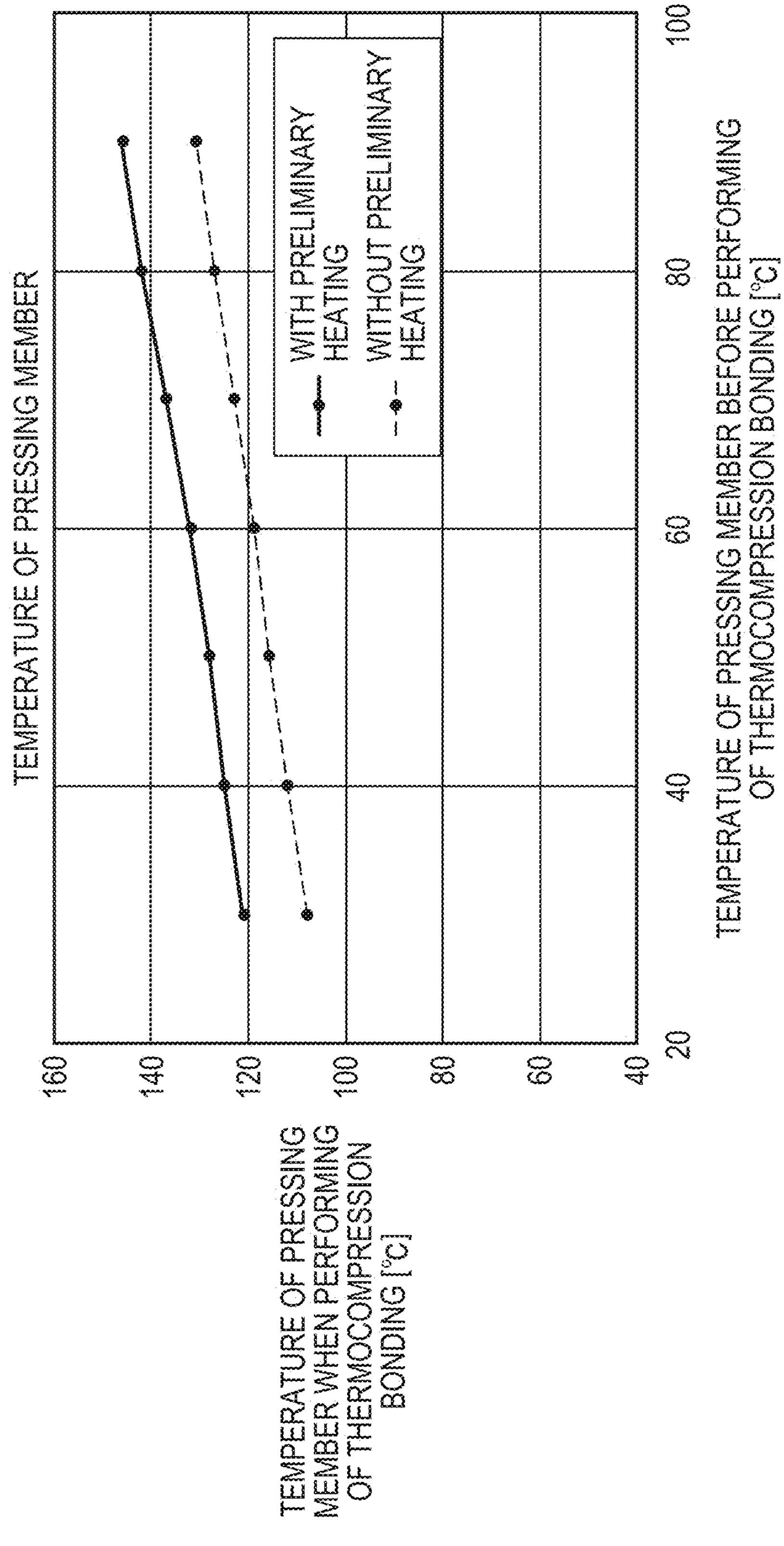
FIG. 10B is a diagram for describing the first embodiment of the present disclosure.

FIGS. 10A and 10B illustrate the results of confirming the relationship between the temperature of the pressing member 67 at the time of thermocompression bonding and the bonding strength and the relationship between the temperature of the pressing member 67 before the thermocompression bonding process and during the process.

It can be seen from FIG. 10A that to stably obtain the bonding strength of 0.5 N/cm needed for a booklet, a temperature from 120 to 140° C. is suitable for the temperature of the pressing member 67 at the time of thermocompression bonding. The bonding strength is higher when the temperature at the time of thermocompression bonding is 140° C., but from the perspective of the degradation of the silicone rubber, it is preferably that the temperature of the pressing member 67 is not increased at the time of thermocompression bonding.

Regarding this, in the present embodiment, it is determined to perform the preliminary heating process so that the temperature of the pressing member 67 at the time of thermocompression bonding is within the range of 120 to 130° C.

FIG. 10B illustrates the results of confirming the temperature of the pressing member 67 before the thermocompression bonding process on the horizontal axis and the temperature of the pressing member 67 at the time of the thermocompression bonding process on the vertical axis with whether or not the preliminary heating process was performed. It can be seen from FIG. 10B that in a case where the temperature of the pressing member 67 before the thermocompression bonding process is approximately 70° C. or less, by performing the preliminary heating process, the temperature of the pressing member 67 at the time of the thermocompression bonding process can be increased to approximately 120° C. which allows the bonding strength of 0.5 N/cm required for a booklet to be obtained.

On the other hand, it can be seen that when the preliminary heating process is performed with the temperature of the pressing member 67 before the thermocompression bonding process being greater than approximately 80° C., the temperature of the pressing member 67 at the time of the thermocompression bonding process is approximately 140° C. This increases the bonding strength, but this temperature is not suitable in terms of the degradation to the silicone rubber. Also, in a case where the temperature of the pressing member 67 before the thermocompression bonding process is greater than approximately 60° C., the preliminary heating process is not performed and the temperature of the pressing member 67 at the time of the thermocompression bonding process can be increased to approximately 120° C. which allows the bonding strength of 0.5 N/cm required for a booklet to be obtained.

Regarding this, in the present embodiment, the preliminary heating process is performed in a case where the temperature of the pressing member 67 before the thermocompression bonding process, as the temperature for obtaining reliable adhesiveness, is 70° C. or less.

In the present embodiment, in a case where the temperature of the pressing member 67 before the thermocompression bonding process is equal to or less than a threshold, for example 70° C. or less, the preliminary heating is performed to obtain a reliable bonding strength. On the other hand, in a case where the temperature of the pressing member 67 is greater than a threshold, for example 70° C., to prevent plastic deformation of the silicone rubber, the thermocompression bonding process is performed without the preliminary heating process. Such control of the preliminary heating is a basic control of the present embodiment. Also, in a case where the temperature of the pressing member 67 is equal to or less than 70° C. as described above, in the preliminary heating process, control is performed to maintain the ceramic heater 70 at 180° C. for 3 seconds.

Temperature of Pressing Member

Next, calculating the temperature of the pressing member 67 for determining whether to perform the preliminary heating process will be described. In the present embodiment, the temperature of the pressing member 67 is calculated on the basis of experiments using the follow factors relating to the thermocompression bonding process as conditions.

- The temperature of the atmosphere environment where the image forming apparatus 1 and the booklet manufacturing apparatus 4 is placed.
- The contents of the booklet manufacturing performed just before and the elapsed time from the completion of booklet manufacture.
- The type of the printing material used in the booklet to be manufactured. For example, whether the type is thin paper, plain paper, thick paper, special paper, or the like.
- As a specification of the booklet to be manufactured, whether a temporary booklet does not need to be manufactured for the booklet or whether the booklet needs a temporary booklet to be manufactured. Specifically, in the present embodiment, this corresponds to whether the booklet is made of five or less printing materials or whether the booklet is made of greater than five printing materials.
- The number of printing materials composing the booklet to be manufactured and the number of booklets.

By performing testing (measuring the temperature of the pressing member) together with other factors, the factors are associated as parameters with the estimated temperature of the pressing member. The association between the parameters and the estimated temperature may be stored as a table, for example. By referencing the combination of the results obtained in this manner, the temperature of the pressing member 67 can be inferred and used in determining whether to perform the preliminary heating process.

In the present embodiment, this is inferred from the results obtained from testing. However, in another example, whether to perform the preliminary heating process may be determined depending on the temperature measured by bringing a thermistor or similar element for detecting temperature into contact with the pressing member. A thermopile, which is a non-contact temperature-measuring element, may be used to measure the temperature, and how to measure the temperature is preferably selected as appropriate depending on the configuration, specification, and the like of the booklet manufacturing unit 50.

Next, the plastic deformation of the pressing member from repeatedly performing the preliminary heating process and the thermocompression bonding process is confirmed as the result according to the present embodiment. The plastic deformation can be seen by observing the surface, but this may be substituted for measuring the hardness of the silicone rubber. The hardness (or softness) of the silicone rubber can be measured using a commercially available hardness tester using a durometer compliant with the JIS K 6253 standard, and in the present embodiment, higher numerical values indicate greater hardness.

Change in the hardness of the silicone rubber include hardening degradation in which the change is an increase in hardness as it is used (hardness increases due to crosslinking advancing) and softening degradation in which the hardness decreases (hardness decreases due to crosslinking dividing) and this changed depending on the composition, formulation, crosslinking condition, and the like of the silicone rubber. The change in the silicone rubber under conditions in which it receives the effects of heat and pressure in use according to the present embodiment is typically softening degradation in which the hardness decreases. By measuring the decrease in hardness of the silicone rubber, the region of advancement in the degradation of the silicone rubber and the plastic deformation where the rubber has lost elasticity is determined.

In the example of the control of the booklet manufacturing apparatus described below, the preliminary heating process includes known control performed each time as a known example and a proposal example according to the present embodiment of performing the preliminary heating process to maintain the ceramic heater 70 at 180° C. for 3 seconds in a case where the temperature of the pressing member 67 is 70° C. or less. 70° C. is an example of a predetermined threshold according to the present embodiment, and the preliminary heating is performed when the temperature is the predetermined threshold or less. With thermocompression bonding, there are two conditions in which the temperature of the pressing member 67 increases and the condition is conducive for degradation of the silicone rubber, repeatedly manufacturing booklets of two pages and manufacturing a booklet of 50 pages by repeatedly manufacturing temporary booklets of 5 pages.

Figure 11:
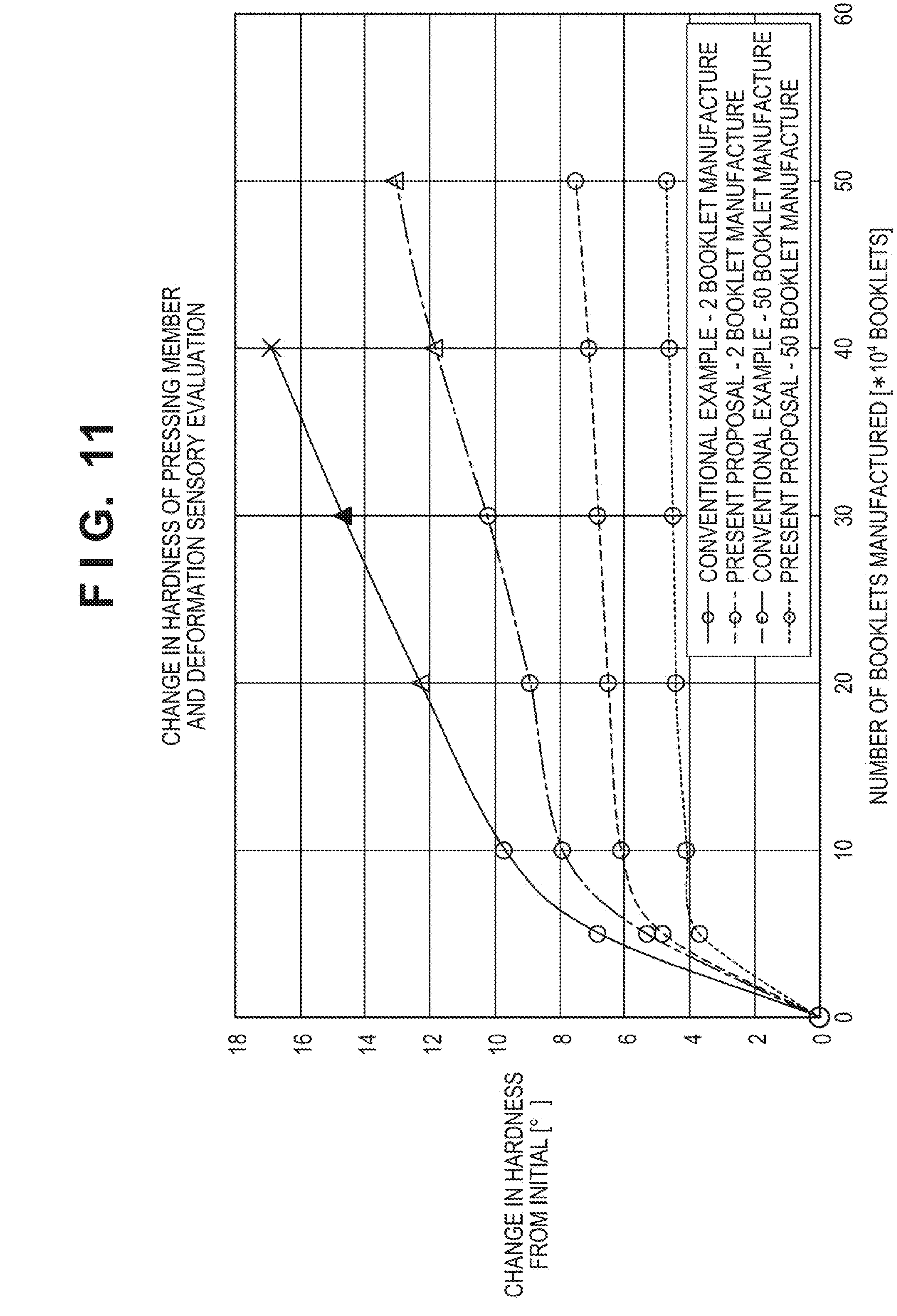
FIG. 11 is a diagram for describing an effect of the first embodiment of the present disclosure.

FIG. 11 illustrates the results of measuring the change in hardness of the silicone rubber of the pressing member for the combinations described above. In addition to the change in hardness, the results are illustrated in the diagram together with the results of a sensory evaluation of deformation of the completed booklet. In the sensory evaluation for confirming the deformation of the booklet, ○ indicates that there is no problem and no deformation is found, Δ indicates that close observation can reveal deformation but the level poses no problems, × indicates that deformation can be quickly and easily found and the level is problematic, and ▲ indicates that deformation in the booklet between Δ and × that is not preferable. As seen from the diagram, with known control, the decrease in hardness when manufacture of a booklet of two pages is repeated is greater and deformation of the booklet is found early. On the other hand, with the proposal example, the decrease in hardness when manufacturing a booklet of 50 pages is small and deformation of the booklet is not found, allowing 500000 booklets to be manufactured.

In a similar manner, with the proposal example, when manufacture of a booklet of 2 pages is repeated, though the decrease in the hardness is greater than when manufacturing a booklet of 50 pages, the decrease in hardness is not enough for deformation of the booklet to be found, allowing 500000 booklets to be manufactured.

In this manner, as the effect according to the present embodiment, manufacture of a booklet with ensured adhesiveness can be confirmed to be possible over the service life of the booklet manufacturing unit 50.

In the present embodiment, the control temperature of the ceramic heater 70 at the time of preliminary heating process is 180° C. However, this is merely an example, and the control temperature may depend on the bonding toner formulation, the configuration of the thermocompression bonding member 61, the product specifications of the booklet manufacturing apparatus 4, the use environment temperature, and similar factors that affect the bonding strength. The control temperature of the ceramic heater 70 at the time of preliminary heating process is set to an optimal temperature as appropriate depending on changes in the factors described above that affect the bonding strength. However, from the perspective of suppressing degradation in the silicone rubber, within a range where a stable bonding strength can be obtained, the lower the control temperature the better.

Also, the control temperature at the time of preliminary heating process is not a fixed value of 180° C., for example, and the temperature may be variably set to any value depending on the condition of the booklet to be manufactured, the total number of booklets manufactured, and similar factors that affect the bonding strength as described above.

Pressing Force in Preliminary Heating Process

Next, the pressing force when preliminary heating process is performed will be described as an application example according to the first embodiment. In the embodiment described above, the pressing force when the preliminary heating process is performed is 294 N (30 Kgf), the same as in the thermocompression bonding process. However, in the following testing, it was found that the preliminary heating process is for increasing the temperature of the pressing member 67, and a pressing force similar to that of the thermocompression bonding process is not necessary.

Figure 12:
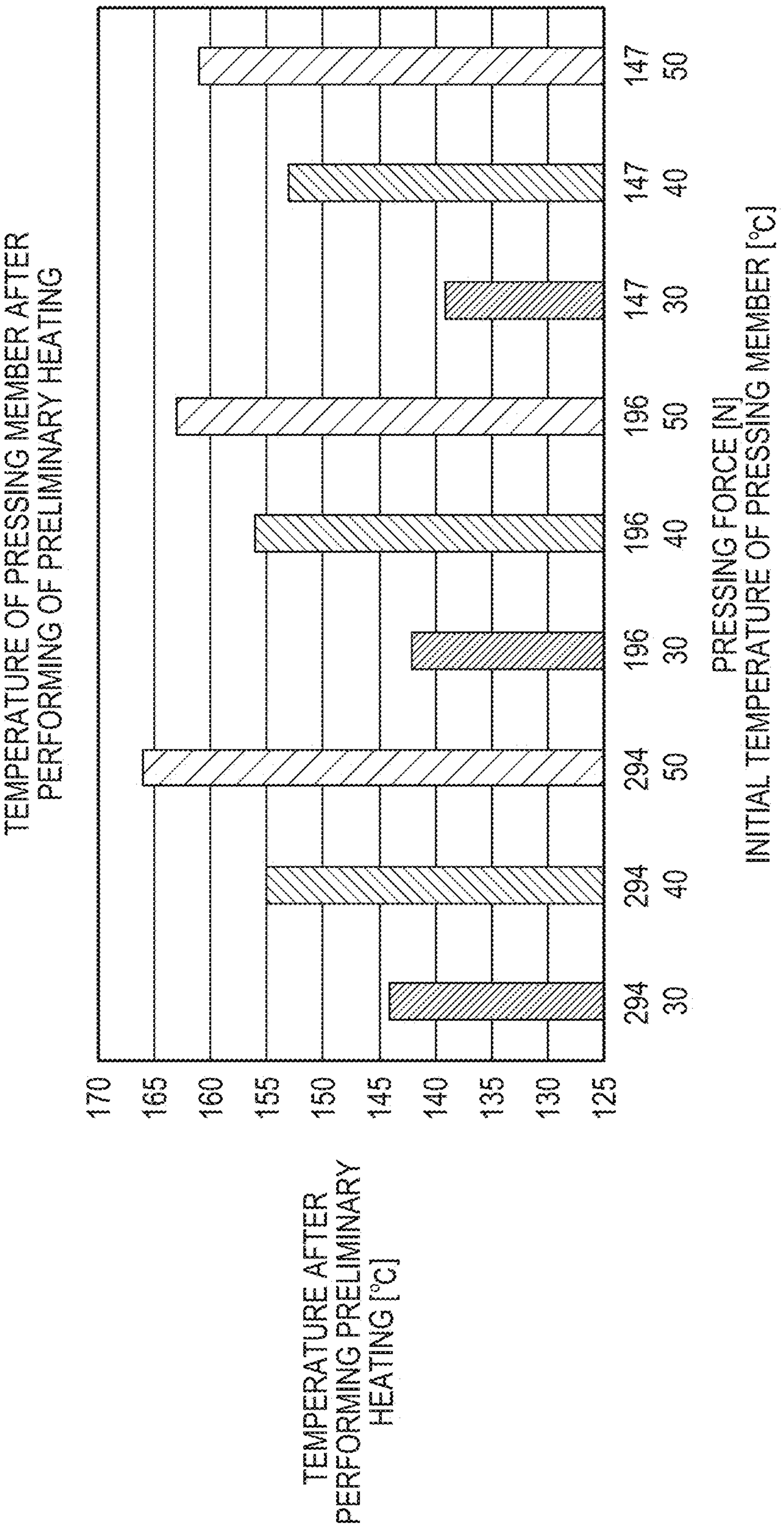
FIG. 12 is a diagram for describing an application example of the first embodiment of the present disclosure.

FIG. 12 illustrates the results of confirming the pressing force when the preliminary heating is performed and the increase in temperature of the pressing member. As can be seen in FIG. 12, the effect of the difference in the pressing force on the temperature increase of the pressing member was small when the pressing force was in a range from 294 N, the same as in the thermocompression bonding process, 196 N (20 Kgf), and 147 N (15 Kgf). This shows that even if the pressing force is small, the effect on the temperature increase of the pressing member is small if a contact area can be ensured for transfer of the heat required to increase the temperature of the pressing member from the thermocompression bonding member 61.

As described above, it is known that the plastic deformation of the silicone rubber forming the pressing member is greatly affected by temperature and pressure. Regarding this, an effective method for preventing compositional deformation of the silicone rubber that is preferably performed as necessary is reducing the pressing force in a range in which the temperature of the pressing member 67 can be increased to a temperature that can obtain the target stable bonding strength, even if the pressing force is low. Here, for example, in the preliminary heating process, the pressing force between the thermocompression bonding member 61 and the pressing member 67 may be less than the 294 N, which is the pressing force for thermocompression bonding, and may be 147 N, which is half the pressing force, as in the example of FIG. 12.

Performing the preliminary heating process to stabilize the bonding strength between the printing materials P as described above is performed in a case where the temperature of the pressing member 67 is a predetermined temperature of 70° C. or less, which is an example of a case in which there is a possibility of bonding strength being insufficient. However, the following control can also be performed.

By repeating thermocompression bonding as booklet manufacturing, the temperature of the pressing member 67 is increased and the preliminary heating process does not need to be performed. However, is may become desirable to perform the preliminary heating process when, as time passes from the thermocompression bonding, the temperature of the pressing member 67 decreases. A decrease in temperature is affected by the atmospheric temperature of the booklet manufacturing unit 50, but it is most affected by the accumulation of heat in the booklet manufacturing unit 50 due to repeatedly performing thermocompression bonding. For example, even in the case of performing thermocompression bonding once, the temperature of the booklet manufacturing unit 50 increases but immediately after decreases. On the other hand, in a case where thermocompression bonding is repeated, the decrease in temperature is gradual due to the increase in the temperature of the booklet manufacturing unit 50 due to the accumulation of heat.

Figure 13:
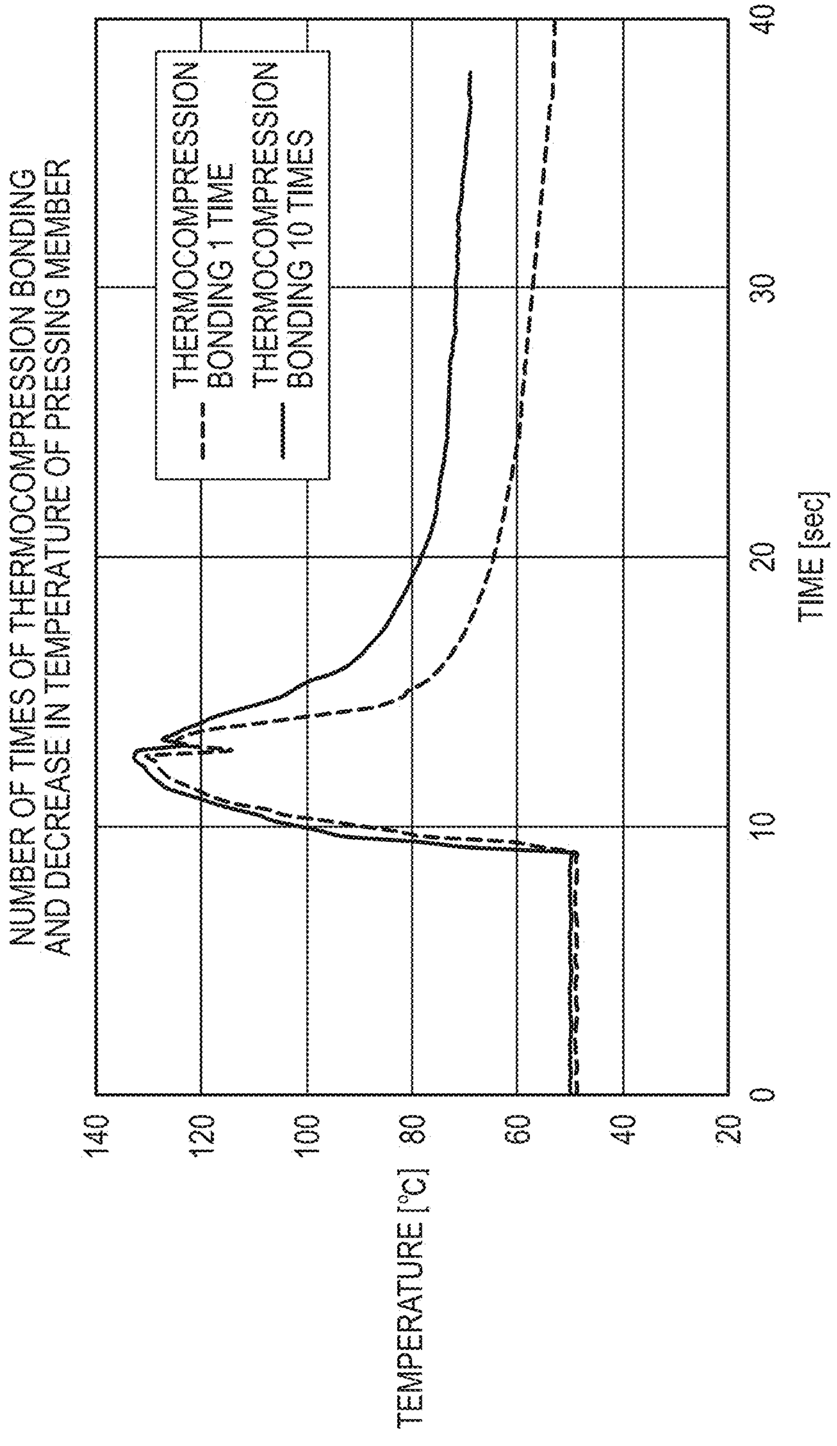
FIG. 13 is a diagram for describing an application example of the first embodiment of the present disclosure.

FIG. 13 is an example of the decrease in temperature of the pressing member 67 in a case where thermocompression bonding when the temperature of the booklet manufacturing unit 50 is approximately 50° C. is performed once and repeated ten times. Such a decrease in the temperature of the pressing member 67 changes due to the thermocompression bonding performed just before. Regarding this, after confirming the relationship between the number of times thermocompression bonding is performed and the decrease in the temperature of the pressing member 67 due to the elapsed time, control to determine whether to perform the preliminary heating process can be considered according to the number of times thermocompression bonding is performed and the decrease in the temperature of just before.

Accordingly, on the basis of the preliminary heating process being performed only when there is a possibility of the bonding strength between the printing materials being insufficient, control is performed to decrease the pressing force, optimize the temperature, and the like at the time of the preliminary heating process.

With such a configuration, plastic deformation of the pressing member 67 made of silicone rubber can be prevented across the service life of the booklet manufacturing apparatus 4, and the booklet manufacturing apparatus 4 that does not have a decrease in the quality of the completed booklets can be provided.

Control of Booklet Manufacturing Unit

By performing the control described above via the control unit of the booklet manufacturing apparatus 4, plastic deformation of the pressing member made of a material, such as silicone rubber, that is susceptible to plastic deformation due to preliminary heating in particular can be prevented. Accordingly, a decrease in the quality of the booklets manufactured using the bonding toner by the booklet manufacturing apparatus can be prevented. Also, the interval between replacing the pressing member is extended, making it economical. Note that manufacturing a booklet manufacturing apparatus 4 via the booklet manufacturing apparatus 4 is performed in cooperation with image forming via the image forming apparatus 1. Thus, control of the booklet manufacturing apparatus 4 may be performed by the control unit of the image forming apparatus 1. In this case, the control unit of the image forming apparatus 1 may be said to function as the control unit of the booklet manufacturing apparatus 4. The configuration of the control unit of the booklet manufacturing apparatus 4 and the control process thereof will be described below.

Figure 19:
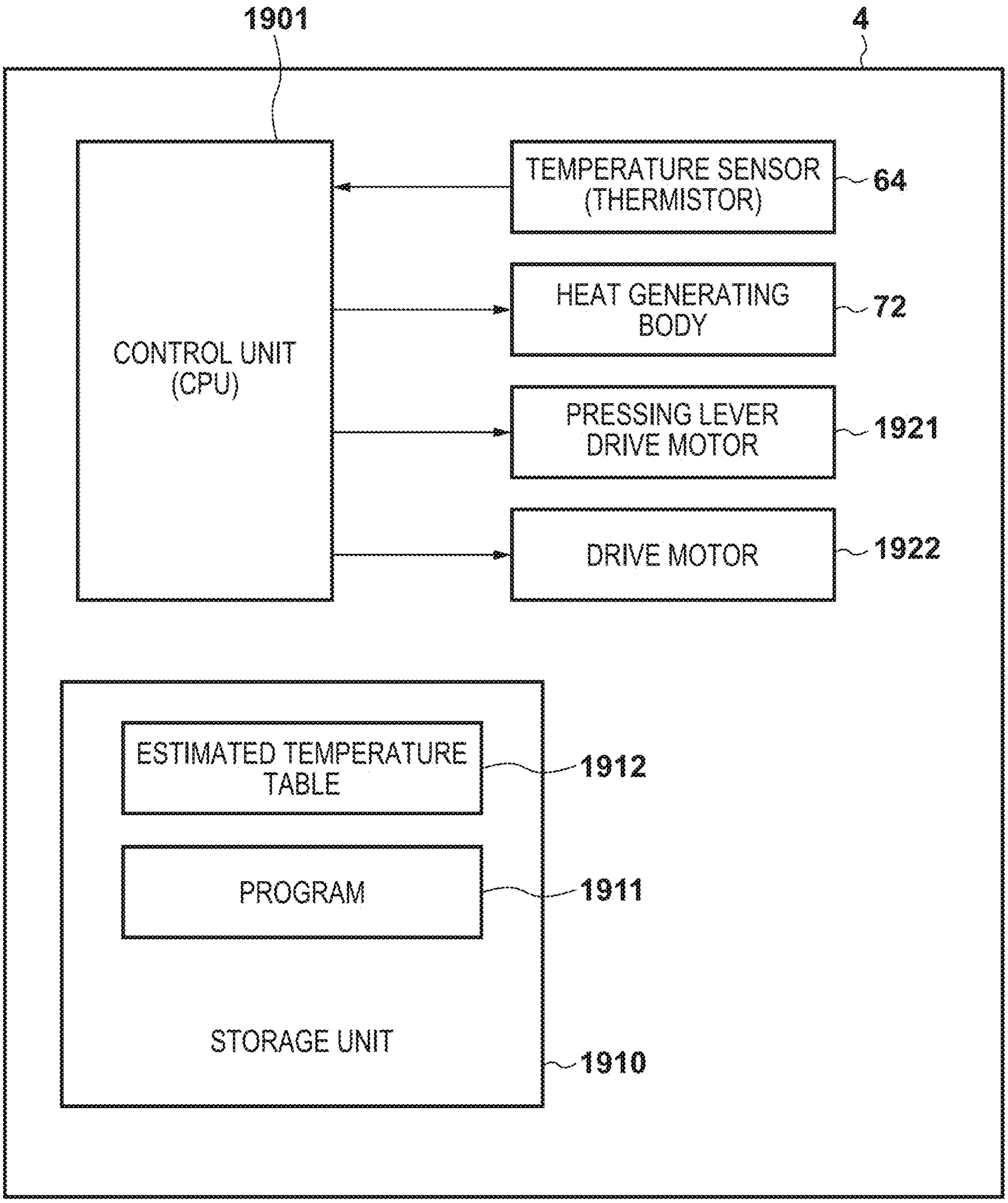
FIG. 19 is a block diagram of a control unit of a booklet manufacturing apparatus.
Figure 20:
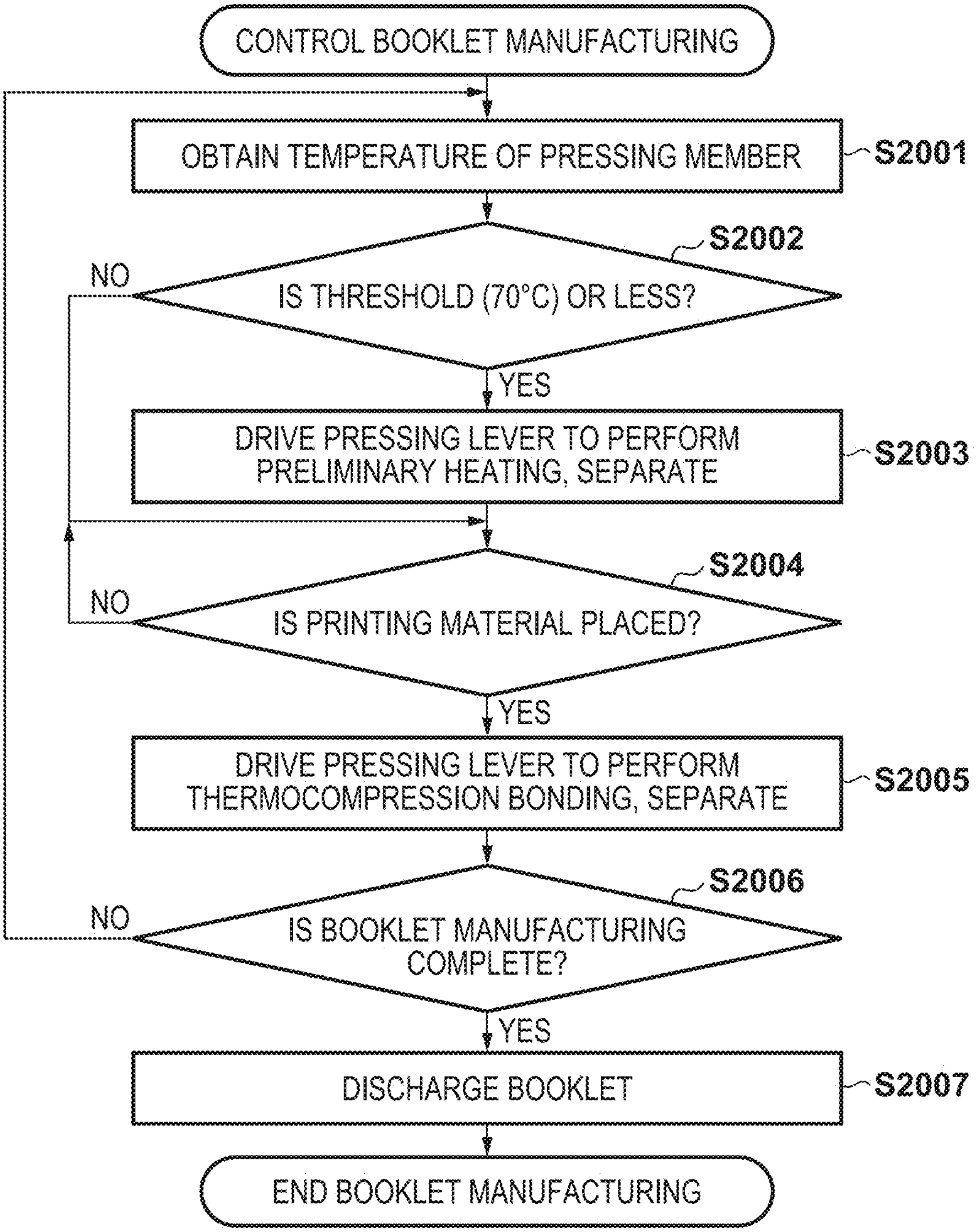
FIG. 20 is a diagram illustrating an example of a control process performed by a control unit of a booklet manufacturing apparatus.

FIG. 19 illustrates a block diagram of the control unit of the booklet manufacturing apparatus 4. FIG. 20 illustrates an example of the control process. In FIG. 19, a control unit 1901 including a CPU or the like controls the booklet manufacturing apparatus 4 by executing a program 1911 stored in a storage unit 1910, for example. A detection signal from the thermistor 64, a temperature sensor, is input to the control unit 1901, allowing the control unit 1901 to detect the temperature of the heat generating body 72 via the heat support 63. The heating by the heat generating body 72 can be controlled, and a drive motor 1922 for driving a pressing lever, which is a drive source for pressing or separating the pressing lever 65 against/from the pressing member 67. Also, the control unit 1901 drives the drive motor 1922 to convey the printing material P conveyed from the image forming apparatus 1 to the booklet manufacturing apparatus 4. The drive motor 1922, for example, also drives the inverting flapper 35, the rear discharge second conveyance roller pair 36, the rear discharge third conveyance roller pair 37, the rear discharge final conveyance roller pair 38, the booklet discharge roller pair 39, the alignment roller 53, the vertical aligning reference plate 55, and the like. The power source for driving the motor, heater, and the like is supplied from a non-illustrated power source unit.

Note that in a case where the control unit 1901 is also the control unit of the image forming apparatus 1, the conveying mechanism and image forming mechanism of the image forming apparatus 1 also become targets for drive control. However, herein, the control of the mechanisms of the image forming apparatus 1 will not be described.

The program 1911 for operating the control unit 1901 in the process of FIG. 20 is stored in the storage unit (or memory) 1910, and the program is loaded onto the RAM and executed by the control unit 1901. Also, an estimated temperature table 1912 for identifying the estimated temperature of the pressing member 67 from the parameters is stored in the storage unit 1910. The parameters include, for example, the environment temperature, the contents (for example, the number of pages or the number of booklets) of the last booklet manufacture and the elapsed time from completion of the last booklet manufacture, and the type of printing material used in the booklet to be manufactured. More examples of the parameters include whether the booklet to be manufactured is a booklet that does not need a temporary booklet to be manufactured or that needs a temporary booklet to be manufactured, the number of printing materials forming the booklet to be manufactured, and the number of booklets. Note that whether the booklet to be manufactured is a booklet that does not need a temporary booklet to be manufactured or that needs a temporary booklet to be manufactured can be determined from the number of booklets to be manufactured. How many printing materials P can be subjected to thermocompression bonding at once, or in other words, if the number of printing materials P (for example, five) compression bonded at once is greater than the page number of the booklet to be manufactured, then it can be determined that manufacture of a temporary booklet is required. If the number is not greater, then it can be determined that it is not required. Accordingly, instead of the parameter for whether a temporary booklet does not need to be manufactured for the booklet or whether the booklet needs a temporary booklet to be manufactured, the number of pages subjected to compression bonding at once may be used as a parameter.

FIG. 20 illustrates an example of the control process of the booklet manufacturing apparatus 4. The process of FIG. 20 is implemented by the control unit 1901, in particular the CPU, executing the program 1911. The process of FIG. 20 is started a predetermined amount of time before the printing material P formed with an image and a bonding toner image is discharged from the image forming apparatus 1 and placed in the intermediate stacking unit 51 of the booklet manufacturing apparatus 4, for example. The predetermined amount of time includes at least the amount of time required for preliminary heating, in other words, the amount of time it takes to move the pressing lever 65 to the position for preliminary heating, the heating time for preliminary heating, the amount of time it takes for the pressing lever 65 to return to the standby position, and the amount of time required for control of these. These amounts of time can be considered constant amounts of time, and the conveying time from the start of image formation on the printing material P to when the printing material P arrives at the intermediate stacking unit 51 may also be considered a constant amount of time. In this case, the timing of the start of the processing of FIG. 20 can be determined to be timing corresponding to the timing of the start of image formation on the printing material P delayed by the amount of time required for preliminary heating and the conveying time. The processing of FIG. 20 is started at the timing determined in this manner. Note that the control of the booklet manufacturing apparatus 4 includes control of the roller for conveying the printing material P, the flapper for switching the conveyance path, both the vertical and horizontal aligning catch, and the like in addition to that illustrated in FIG. 20. However, here, the process of preliminary heating and thermal fixing will be focused on in the description.

In executing the processing of FIG. 20, first, the control unit 1901 obtains the temperature of the pressing member 67 (step S2001). If a temperature sensor is provided to measuring the temperature of the pressing member 67, a temperature signal is obtained from the temperature sensor to obtain the temperature. However, in the present example, the estimated temperature table 1912 is referenced to obtain the estimated temperature. The parameter includes at least one the environment temperature, the contents (for example, the number of pages or the number of booklets) of the last booklet manufacture, the elapsed time from completion of the last booklet manufacture, the type of printing material used, the number of pages compression bonded at once, the number of printing materials in the booklet to be manufactured, and the number of booklets.

The environment temperature may be detected by a non-illustrated environment temperature sensor. The number of pages of the booklet last manufactured and the number of booklets last manufactured, the type of printing material used, and the number of pages of printing material in the booklet to be manufactured and the number of booklets may be obtained from the control unit of the image forming apparatus 1. The elapsed time from the completion of the last booklet manufacture may be a time measured with a non-illustrated timer that is started when the booklet is discharged. The number of pages compression bonded at once may be a setting value separately set. Note that in a case where the control unit of the image forming apparatus 1 is also the control unit 1901 of the booklet manufacturing apparatus 4, the parameters obtained from the control unit of the image forming apparatus 1 may be values held by the control unit 1901 of the booklet manufacturing apparatus 4 until obtained. The estimated temperature table 1912 stores the estimated temperature of the pressing member 67 measured in advance associated with the parameters. In step S2001, the estimated temperature can be obtained by identifying the parameter value.

Next, the control unit 1901 determines whether the obtained temperature is equal to or less than a predetermined value which is a threshold (step S2002). In the present example, the threshold is 70° C. If the obtained temperature is equal to or less than the threshold, the heat generating body 72 is heated, the pressing lever 65 is driven by the drive motor 1922, the first pressure plate 62 is pressed against the pressing member 67, and preliminary heating is performed (step S2003). The pressure, temperature, and time at this time are as described above, and the preliminary heating is performed with a pressure of 147 N at a temperature of 180° C. for 3 seconds, for example. If the obtained temperature is greater than the threshold, step S2003 is skipped.

If preliminary heating has been performed according to the conditions, the control unit 1901 goes on standby until the printing material P for thermocompression bonding is aligned and placed in the intermediate stacking unit 51 (step S2004). Here, it is determined that the printing material P is aligned and placed in the intermediate stacking unit 51 if, after the printing material P for thermocompression bonding is discharged from the image forming apparatus 1, the printing materials P are aligned at both the vertical and horizontal alignment position. At this time, if the number of printing materials P for compression bonding is less than the number of pages that can be compression bonded at one time, if that number of pages is together, in step S2004, it may be determined that the printing materials P are aligned and placed in the intermediate stacking unit 51. If the number of printing materials P for compression bonding is equal to or greater than the number of pages that can be compression bonded at one time, if the number of pages that can be compression bonded at one time (for example, 5 pages) is together, in step S2004, it may be determined that the printing materials P are aligned and placed in the intermediate stacking unit 51. At this time, a stack of the printing material P that have been subjected to thermocompression bonding may be below the number of printing materials P that can be compression bonded at one time.

If the printing material P for thermocompression bonding is aligned and placed in the intermediate stacking unit 51, the control unit 1901 heats the heat generating body 72, drives the pressing lever 65 via the drive motor 1922, presses the first pressure plate 62 against the pressing member 67, and performs thermocompression bonding (step S2005). The conditions at this time for the thermocompression bonding may be, for example, a pressure of 294 N, a temperature of 180° C., and a time of 3 seconds.

Thereafter, the control unit 1901 determines whether manufacture of a booklet is complete in the thermocompression bonding processing (step S2006). If this is complete, the control unit 1901 drives the drive motor 1922 as necessary and discharges one booklet that is complete from the intermediate stacking unit 51 to the discharge lower tray 34 (step S2007). On the other hand, if this is not complete and the stack of the printing material P placed in the intermediate stacking unit 51 is a temporary booklet, the process from step S2002 is repeated and booklet manufacture processing is executed.

As described above, according to the present embodiment, with a configuration in which thermocompression bonding is performed on printing material using bonding toner, a pressing member made of an elastic material is subjected to preliminary heating depending on the temperature of the pressing member, allowing the frequency of preliminary heating to be decreased. This can prevent plastic deformation of the pressing member. Also, by reducing the pressure on the pressing member when preliminary heating is performed compared to when thermocompression bonding is performed can further help prevent plastic deformation of the pressing member. In particular, for a pressing member using silicone rubber as the elastic material, as described in the embodiment, by preventing plastic deformation, a decrease in the quality of the manufactured booklet can be suppressed.

Note that in step S2001 of FIG. 20, using the estimated temperature table 1912 of FIG. 19, the temperature of the pressing member 67 is obtained and whether the temperature is equal to or less than a threshold is determined in step S2002. However, the parameters used in threshold estimation or one or more of thereof may be used as determination criteria. For example, whether or not to perform preliminary heating may be determined using a combination of the number of times booklet manufacture has been performed (for example, the number of booklets) and the elapsed time from the last time.

Also, in the estimated temperature table 1912 of FIG. 19, the parameter values and the associated temperatures are stored. Here, instead of the temperature being equal to or less than a threshold (for example, 70° C.), information indicating that preliminary heating is required may be stored, and instead of the temperature being greater than a threshold (for example, 70° C.), information indicating that preliminary heating is not required may be stored. By referencing the table in this manner, whether or not to perform preliminary heating can be determined in step S2002 of FIG. 20 on the basis of the information stored in the table without estimating the temperature.

Second Embodiment

As in the first embodiment, the problem related to the second embodiment of the present disclosure is plastic deformation, which is degradation of the pressing member 67 made of silicone rubber. However, the present embodiment focuses on and deals with localized plastic deformation in the pressing member 67. As in the first embodiment, the second embodiment also uses the booklet manufacturing apparatus 4, and sections in common will not be described.

The booklet manufacturing apparatus 4 according to the present embodiment can manufacture booklets using the printing material P with a maximum size of A4 size and a minimum size of A5 size as described above. With the booklet manufacturing apparatus 4 that can manufacture booklets using the printing material P in a range from the minimum size A5 to the maximum size A4, it was found that the following plastic deformation occurs in the silicone rubber of the pressing member 67 when booklet manufacturing was repeatedly performed using the printing material P of the minimum A5 size.

As described above, the effective length of the thermocompression bonding member 61 and the pressing member 67 is a length that reliably allows thermocompression bonding to be performed on the long side 298 mm of the printing material P of the maximum A4 size, with the first pressure plate 62 of the thermocompression bonding member 61 having an effective length of 300 mm and the pressing member 67 having an effective length of 320 mm. Thus, in a case where a booklet is manufactured by bonding the long side 210 mm of the printing material P of the minimum A5 size, there is a portion of the thermocompression bonding member 61 and the pressing member 67 (hereinafter referred to as a non-printing material portion) where there is no printing material P present. In the present embodiment, in a case where a booklet is manufactured using the printing material P of the minimum A5 size, the difference in the long sides between the A4 size and the A5 size is 87 mm (297-210), and this difference corresponds to the non-printing material portion, that is, a region on the pressing member 67 where the printing material P is not present.

When thermocompression bonding is performed to manufacture a booklet using the printing material P of A5 size, the 87 mm non-printing material portion is subjected to thermocompression bonding while in direct contact with the pressing member 67 with the ceramic heater 70, which is the heat source included in the thermocompression bonding member 61, generating heat. The pressing member 67 at the portion where the printing material P is present receives an amount of heat transferred via the printing material P and the bonding toner Tn image, while for the non-printing material portion, the amount of heat required to melt the bonding toner Tn image is directly transferred to it from the thermocompression bonding member 61.

Accordingly, the amount of heat the pressing member 67 receives at the non-printing material portion is greater than that received at the portion where the printing material P is present. Thus, it was found that this effect on the degradation of the silicone rubber of the pressing member 67 is great and may lead to plastic deformation of the pressing member 67.

On the other hand, the degradation of the silicone rubber at the portion where the printing material P is present is small, and the elasticity, which is a characteristic of rubber, can be maintained. For the pressing member 67 with such localized degradation, if booklet manufacture is performed only using the printing material P of A5 size, no damage will be found. However, if booklet manufacture is performed using the printing material P of a size such as A4 size which is larger than the A5 size, for example, the following damage may be found.

Figure 14:
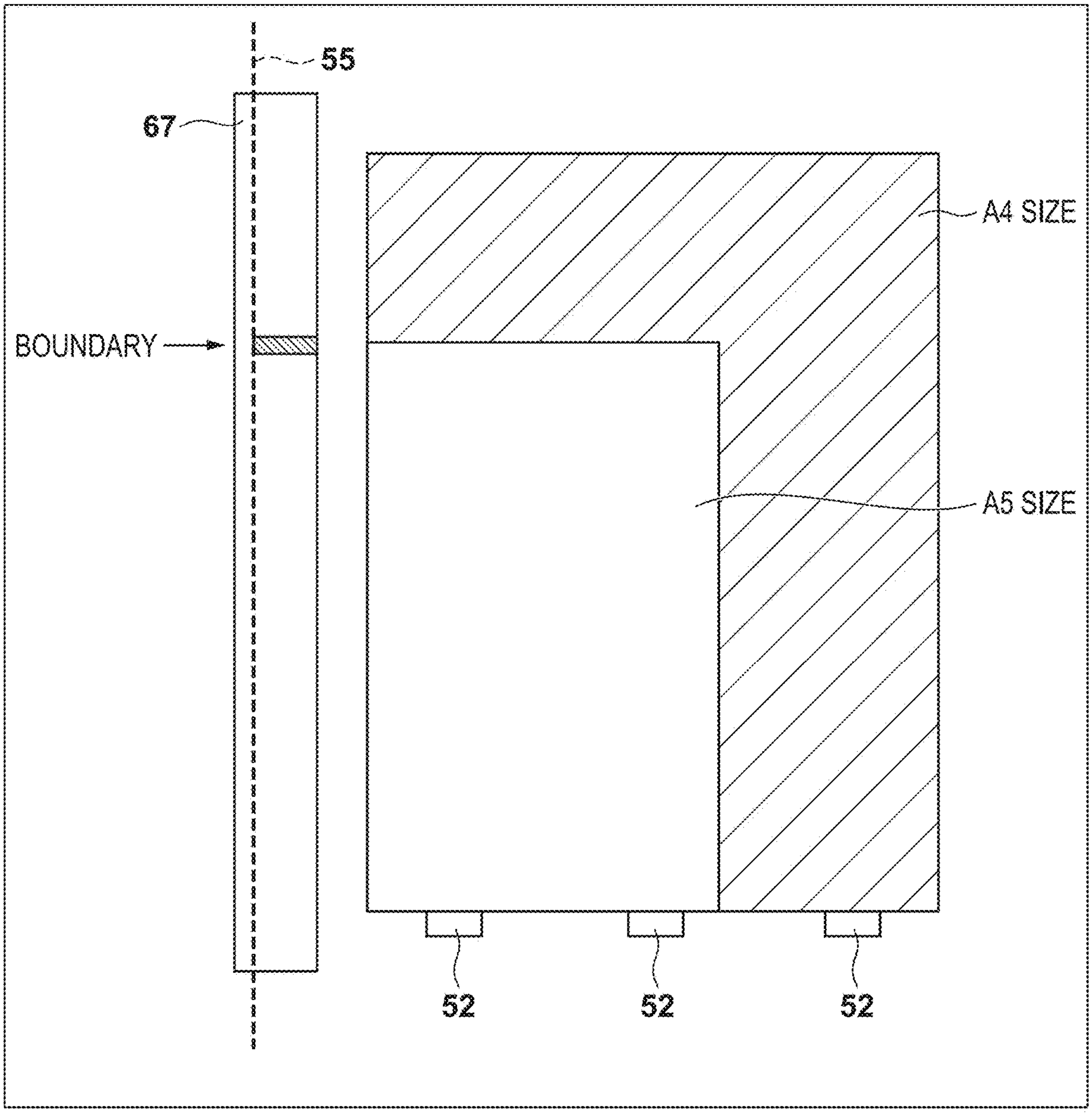
FIG. 14 is a diagram for describing a problem related to a second embodiment of the present disclosure.

The phenomenon found as damage is, as illustrated in FIG. 14, a crease mark in a booklet manufactured using A4 size produced by the difference in degradation of the silicone rubber at a boundary which is the position of the paper end portion where A5 size is aligned for the silicone rubber, which is the pressing member 67. Such a phenomenon is not limited to a case where a booklet is repeatedly manufactured using the printing material P of the minimum A5 size. The phenomenon occurs even when repeatedly manufacturing a booklet using the printing material P with a size that is smaller than the maximum printing material P size (in the present embodiment, A4 size) that can be used in manufacturing by the booklet manufacturing apparatus 4.

Figure 4:
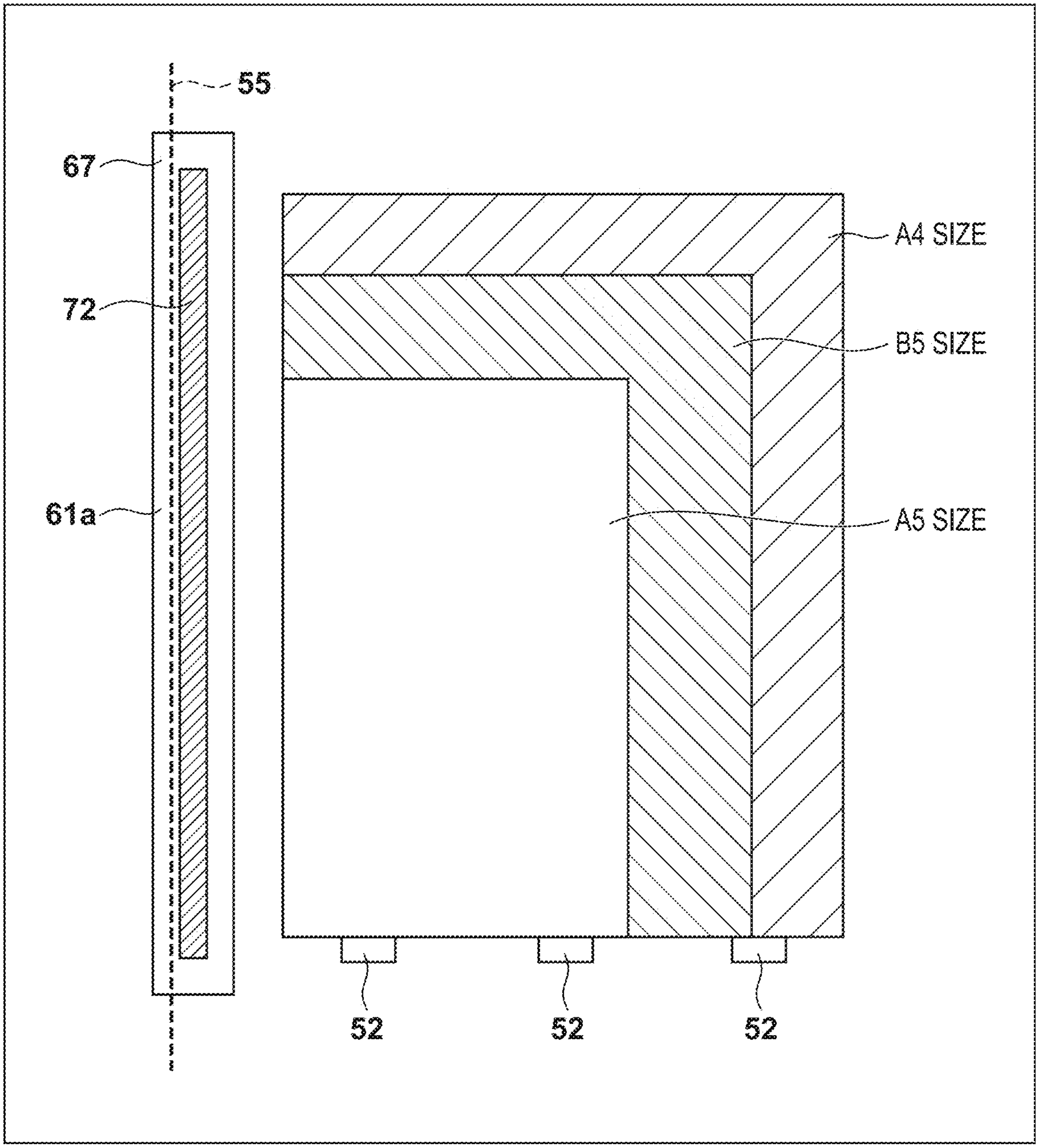
FIG. 4 is a diagram illustrating the configuration of a booklet manufacturing apparatus used in an embodiment of the present disclosure.

In the second embodiment of the present disclosure, in a case where a booklet is manufactured using the printing material P with a size that is smaller than the maximum size that can be used for booklet manufacture, the alignment position of the printing material P with a small size is not a fixed position as illustrated in FIG. 4 and can be changed each time a booklet is manufactured. In this manner, the non-printing material portion can be evenly distributed, and localized degradation in the silicone rubber of the pressing member 67 can be avoided. Enhancement examples of the second embodiment are illustrated in FIGS. 15A to 15E.

Figure 15A:
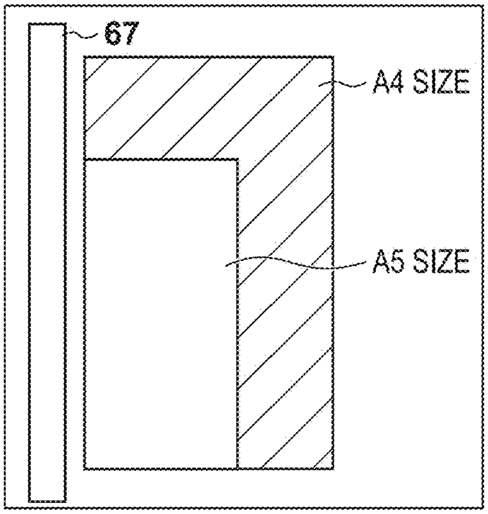
FIGS. 15A to 15E are diagrams for describing the operations of the second embodiment of the present disclosure.
Figure 15B:
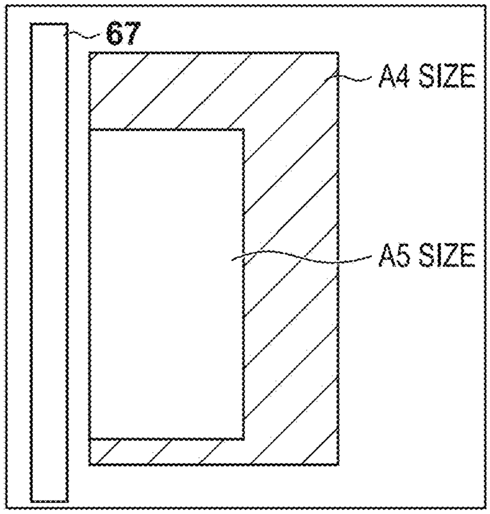
Figure 15C:
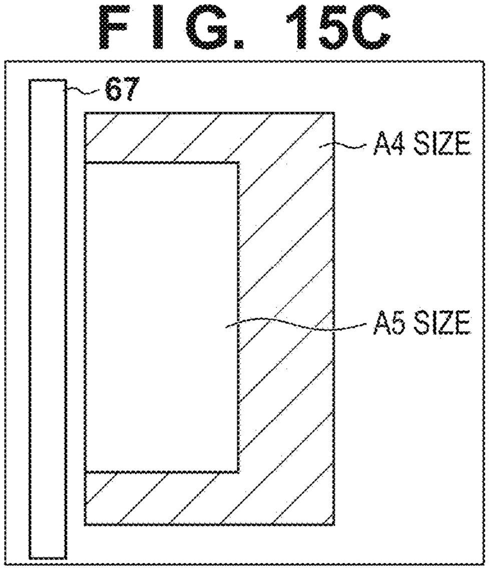
Figure 15D:
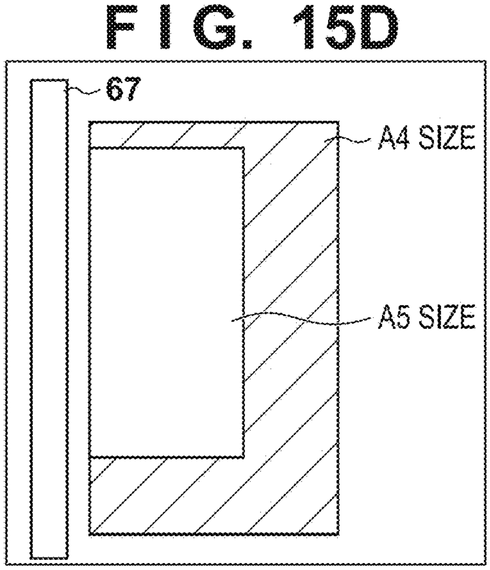
Figure 15E:
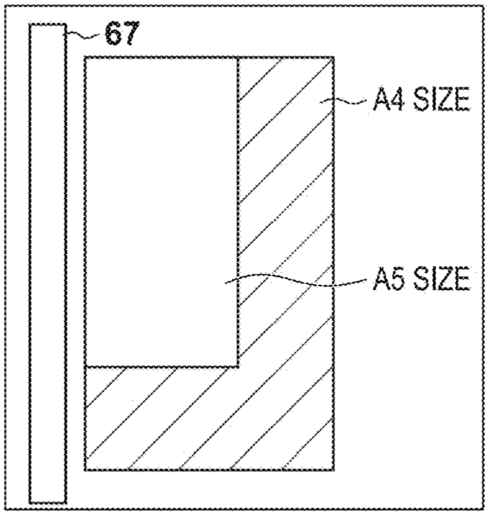

FIGS. 15A to 15E illustrate examples of an A5 size, with the alignment position in the conveyance direction of the printing material P being changed. Examples of alignment positions 1 to 5 are illustrated in this order in FIGS. 15A to 15E. The first booklet manufacture is the alignment position 1 (FIG. 15A), the second booklet manufacture is the alignment position 2 (FIG. 15B), the third booklet manufacture is the alignment position 3 (FIG. 15C), the fourth booklet manufacture is the alignment position 4 (FIG. 15D), and the fifth booklet manufacture is the alignment position 5 (FIG. 15E). For the sixth booklet manufacture onward, the sixth booklet alignment position uses the alignment position of the number obtained by finding the remainder when the booklet manufacture number of times is divided by 5 (if the remainder is 0, 5 is used), such that the sixth booklet manufacture is the alignment position 1, the seventh booklet manufacture is the alignment position 2, and the like. This is repeated to perform thermocompression bonding. In this manner, a plurality of alignment positions are set, and the positions are offset from one another. In this example, the plurality of alignment positions are the same in the short side direction of the printing material but are offset from one another so that the positions are different in the long side direction. By circularly aligning the printing materials at the plurality of alignment positions offset in this manner, the non-printing material portion of the pressing member 67 can be varied. Next, the effects from evenly distributing the non-printing material portions will be described. The effects are confirmed by periodically measuring the hardness of the silicone rubber at the end portion position of the printing material P of A5 size while repeatedly manufacturing booklets made of 10 printing materials P of A5 size. Also, periodically, a booklet is manufactured using the printing material P of A4 size and a sensory evaluation is performed on the crease mark of the completed booklet. The hardness measurement is represented the alignment position of the end portion of the printing material P of A5 size illustrated in FIG. 4 for a known example and the average value of positions corresponding to the end portion of the printing material P of A5 size for each of the five alignment positions for the present embodiment. In the sensory evaluation, the ranks are as in the first embodiment.

Figure 16:
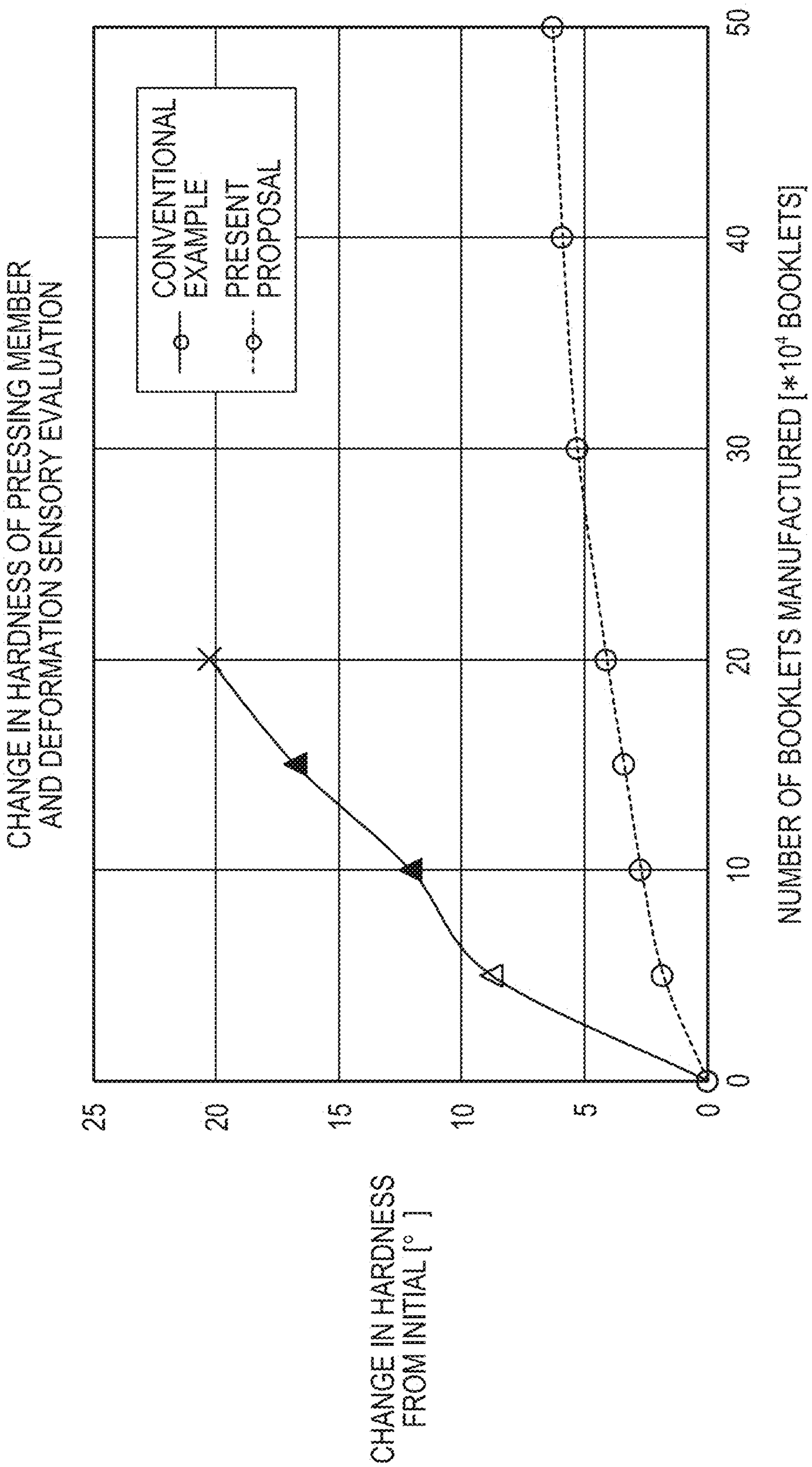
FIG. 16 is a diagram for describing an effect of the second embodiment of the present disclosure.

The results are illustrated in FIG. 16. In the known example illustrated in FIG. 16, at confirmation when the number of manufactured booklets was 100000, the change is hardness from the initial hardness was 12°, and in the sensory evaluation, a crease mark of a non-preferable level was found at the boundary position of A5 size (indicated by ▲). However, in the second embodiment, the change in hardness when the number of manufactured booklets was 100000 was 3° or less and no crease mark was found (indicated by ○). Thereafter, after repeatedly manufacturing booklets, the change in hardness at confirmation when the number of manufactured booklets was 500000 was approximately 6° and no crease mark was found. In this manner, the effects of the second embodiment were confirmed.

Next, an application example of the second embodiment will be described. In the embodiment described above, control is performed to divide the alignment positions in the width direction of the printing material P for each thermocompression bonding into 5 different patterns so that the non-printing material portion is evenly distributed. However, it was found that even with a fixed pattern of 5, the following phenomenon occurs.

Figure 17A:
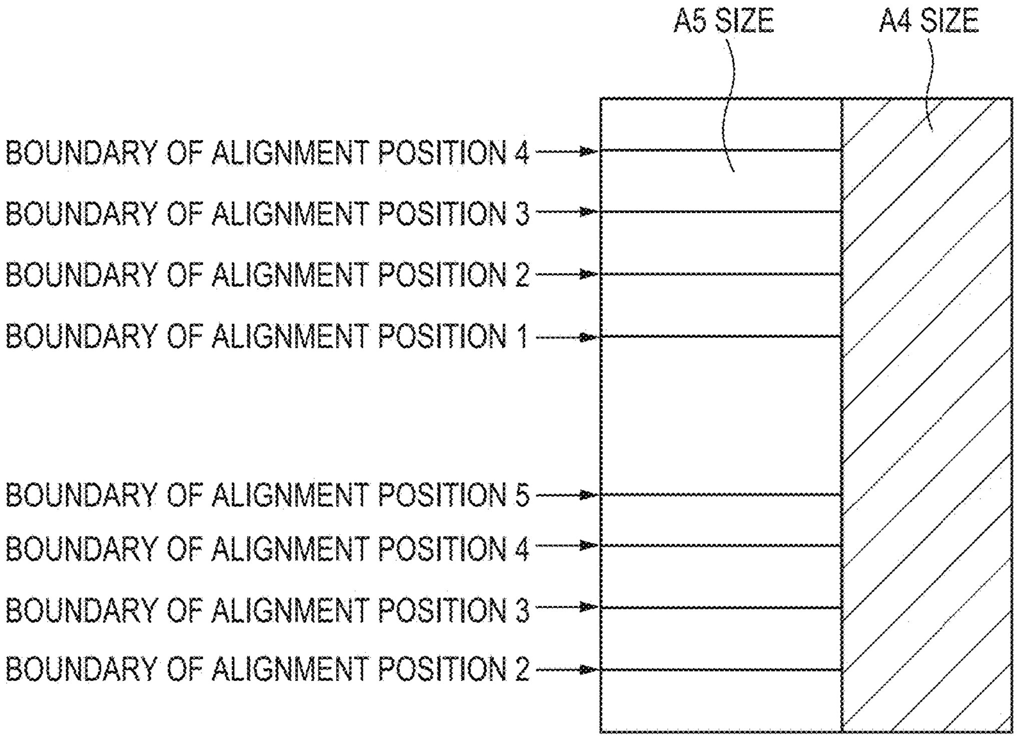
FIG. 17A is a diagram for describing an application example of the second embodiment of the present disclosure.

As illustrated in FIG. 17A, by setting the alignment positions in the width direction of the printing material P into 5 levels, the non-printing material portion can be evenly distributed, but the boundary between the non-printing material portion and the printing material P is repeatedly at the same position every five times. The position corresponding to the boundary is repeatedly at the same position of the silicone rubber of the pressing member 67, and thus it was found that the change in the hardness of the silicone rubber at the boundary portion is greater than the change in the hardness at positions other than the boundary.

Figure 17B:
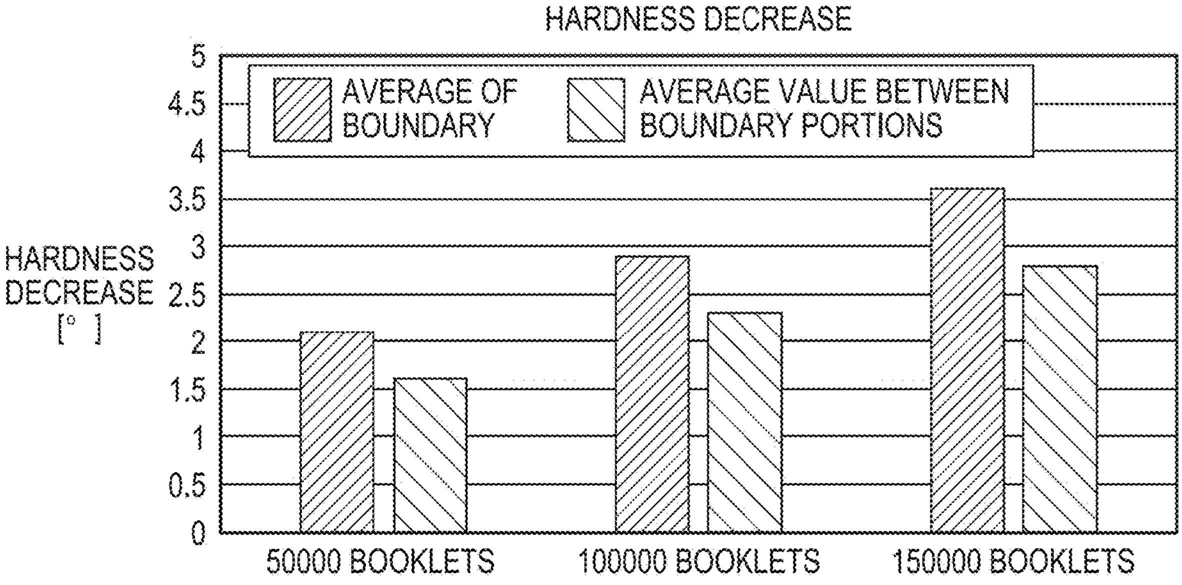
FIG. 17B is a diagram for describing an application example of the second embodiment of the present disclosure.

The results of changes in hardness are illustrated in FIG. 17B. As can be seen from FIG. 17B, the change in hardness is different between a position corresponding to the boundary and a position not corresponding to a boundary. As an application example of the second embodiment, instead of having fixed positions for the five levels of the position for regulating the end of the printing material P with the horizontal aligning reference plate 52 as illustrated in FIGS. 15A to 15E, as a control method for changing the position each time thermocompression bonding is performed, the regulating position of the horizontal aligning reference plate 52 is changed in the conveyance direction of the printing material by 3 mm.

By further varying the boundary portion for alignment at fixed positions in this manner, degradation of the silicone rubber that occurs at the boundary portions can be further reduced. Control to change the position for aligning the printing material P used to manufacture a booklet is an effective method for reducing the degradation of the silicone rubber of the pressing member 67, and, preferably, control in accordance with the specifications of the booklet manufacturing apparatus 4 is performed.

Control of Booklet Manufacturing Unit

Figure 21:
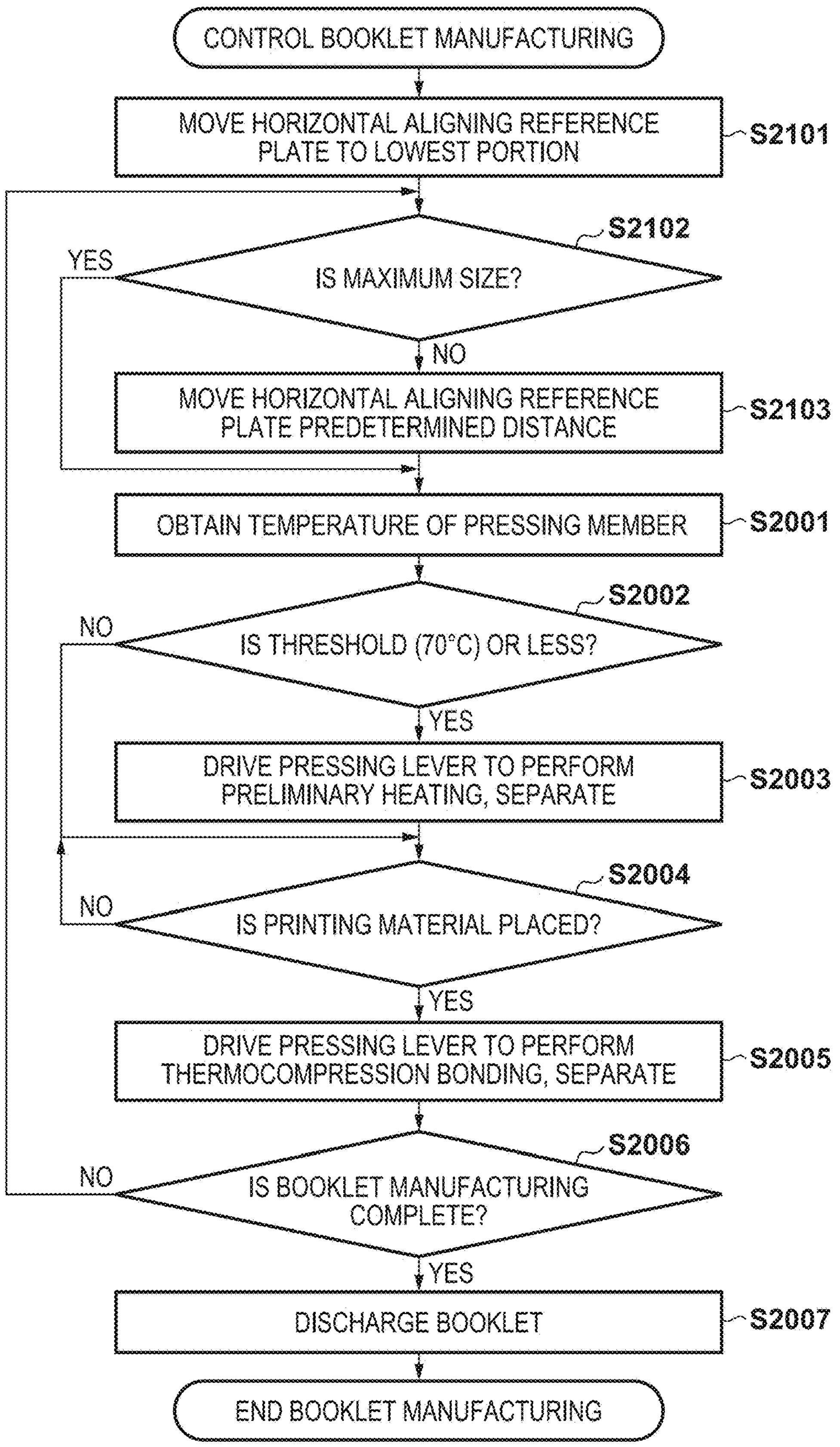
FIG. 21 is a diagram illustrating an example of a control process performed by a control unit of a booklet manufacturing apparatus.

FIG. 21 illustrates an example of a control process according to the present embodiment by the control unit 1901. The configuration of the control unit 1901 may be similar to that in the first embodiment. The processing of FIG. 21 corresponds to the processing of FIG. 20 with steps S2101 to S2103 added. The added steps will be described, while the steps that are in common with FIG. 20 will not be described. Also, the start in FIG. 21 may be triggered in a similar manner as in FIG. 20.

The control unit 1901 first drives the horizontal aligning reference plate 52 and moves it to the lowest portion (step S2101). The lowest portion is a position used as a reference when manufacturing booklets using the printing material P of the maximum size according to the present embodiment.

Next, the control unit 1901 determines whether the size of the printing material P of the booklet to be manufactured is the maximum size that can be used to manufacture a booklet (step S2102). In the present example, whether the size is A4 size is determined. In a case where it is determined to be the maximum size, the processing branches to step S2001, and a booklet is manufactured via control as in the first embodiment.

In a case where it is determined to not be the maximum size, the control unit 1901 drives the horizontal aligning reference plate 52 and moves it a predetermined distance (step S2103). The predetermined distance is (A4 long side length−A5 long side length)/4 in a case where the horizontal aligning reference plate 52 is at any one of the alignment position 1 to the alignment position 4 as in the examples of FIGS. 15A to 15E, and the movement direction is the upward direction of FIGS. 15A to 15E, that is, to the side of the printing material P from the horizontal alignment position. Via this movement, the horizontal alignment position is offset by a quarter of the length of the non-printing material portion each booklet. Also, the predetermined distance is (A4 long side length−A5 long side length) in a case where the horizontal aligning reference plate 52 is the alignment position 5, and the movement direction is the downward direction of FIGS. 15A to 15E, that is, to the opposite side of the printing material P from the horizontal alignment position. Via this movement, the horizontal alignment position is returned to the lowest portion. In other words, if the uppermost portion of the alignment positions set in advance has been reached, the lowest portion is returned to. Note that with this control, the first booklet starts from the alignment position 2 of FIGS. 15A to 15E. However, since the goal according to the present embodiment is to offset the alignment position each booklet, any starting position may be used.

Also, according to an enhancement example according to the second embodiment, the predetermined distance in step S2103 is a constant distance and may be 3 mm in the upward direction of FIGS. 15A to 15E, for example. In this case, if the upper side of the booklet to be manufactured would stick out from the ceramic heater 70 due to the movement by the horizontal aligning reference plate 52, the horizontal aligning reference plate 52 is returned to the lowest portion. Accordingly, an accumulated value of the movement distance of the horizontal aligning reference plate 52 in step S2103 is subtracted from the length subtracted in the long side direction of the booklet from the length in the long side direction of the ceramic heater 70, and if the value is less than 0, the horizontal aligning reference plate 52 is returned to the lowest portion. In this case, the horizontal aligning reference plate 52 is returned to the lowest portion and the accumulated value of the movement distance of the horizontal aligning reference plate 52 is returned to 0. Thereafter, the control unit 1901 executes the booklet manufacture processing from step S2001.

As described above, according to the present embodiment, if the size can be used for manufacture in the booklet manufacturing apparatus 4, high quality booklets can be manufactured throughout the service life of the booklet manufacturing apparatus 4. Specifically, even if manufacture is repeated of booklets of the printing material P of a size that is smaller than the maximum size that can be used in manufacture by the booklet manufacturing apparatus 4 according to the present embodiment, no obvious crease marks are formed in the completed booklet and a high quality is achieved. Also, the manufacture of high quality booklets can be continued throughout the service life of the booklet manufacturing apparatus 4.

Note that in the processing of FIG. 21, the position of the horizontal aligning reference plate 52 is changed per thermocompression bonding, for example, each time thermocompression bonding is performed on five printing materials. However, the position may be changed each time a booklet is discharged.

Third Embodiment

As in the second embodiment, the problem related to the third embodiment of the present disclosure is reducing the degradation of the silicone rubber of the pressing member 67 in booklet manufacture using the printing material P of a size that is smaller than the maximum size that can be used in booklet manufacture. As in the first and second embodiment, the third embodiment also uses the booklet manufacturing apparatus 4, and sections in common will not be described.

Figure 18A:
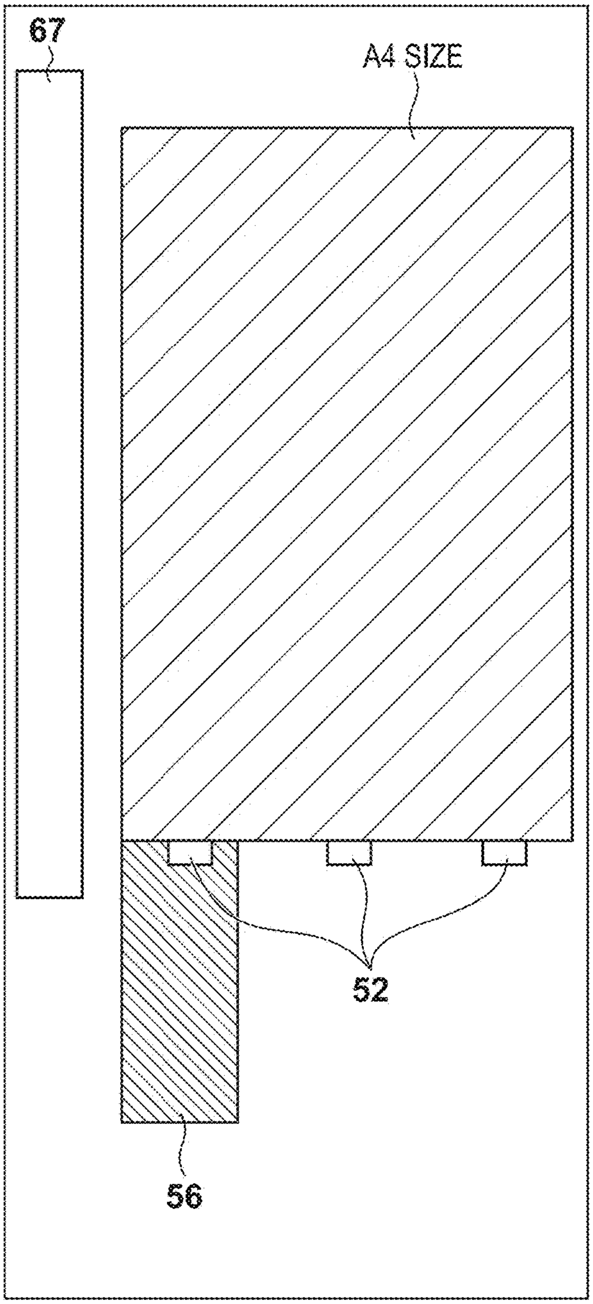
FIG. 18A is a diagram for describing a third embodiment of the present disclosure.

The third embodiment described here is an example that uses the printing material P of A5 size, which is the minimum size for the printing material P. As illustrated in FIG. 18A, the third embodiment has a configuration that includes a sheet as a printing material alternative member 56 at a lower portion of the horizontal aligning reference plate 52 in the diagram. The horizontal aligning reference plate 52 is regulated so that the positions where the printing material P of A5 size is regulated by the horizontal aligning reference plate 52 are aligned on the downstream side of the conveyance direction of A4, which is the maximum size of the printing material P that can be used in booklet manufacture in the present embodiment as illustrated in FIG. 18A.

When the positions of the printing material P of A5 size are regulated by the horizontal aligning reference plate 52 as illustrated in FIGS. 15A to 15E and FIG. 18A, the non-printing material portion forms on the upstream side of the conveyance direction of the printing material P as illustrated in the diagrams. In the third embodiment, the sheet, which is the printing material alternative member 56, included in the horizontal aligning reference plate 52 is present at the non-printing material portion formed on the upstream side of the conveyance direction of the printing material P. Note that here, upstream means the lower side in the diagram, that is, the upstream side of the conveyance direction when discharging a booklet and is the side of the horizontal aligning reference plate 52 where the printing material P is not present as illustrated in FIG. 14.

In the present embodiment, the sheet, which is the printing material alternative member 56, is also moved in conjunction with the horizontal aligning reference plate 52 being moved to change the position for regulating the printing material P. In this manner, the sheet, which is the printing material alternative member 56, is present at the non-printing material P portion present at the upstream side (lower side in the diagram) on the conveyance direction of the printing material P. Thus, at the non-printing material portion also, the thermocompression bonding member 61 is brought close to the silicone rubber of the pressing member 67 with the sheet disposed inbetween, not coming into direct contact.

The sheet, which is the printing material alternative member 56, will now be described. The printing material P is present between the thermocompression bonding member 61 and the pressing member 67 when booklet manufacture is normally performed. It is possible to achieve the goal of the third embodiment of not forming the non-printing material P portion even when the sheet, which is the printing material alternative member 56, is formed of the printing material P, but when thermocompression bonding is repeatedly performed using the same printing material P, a typical printing material P represented by OA sheets and the like are damaged.

Regarding this, in the present embodiment, as a material with durability to resist damage even if thermocompression bonding is repeatedly performed and heat resistance with respect to the amount of heat from the thermocompression bonding member 61, a fluororesin or a polyimide resin formed in a sheet shape may be used. Such a material can be used as the sheet, which is the printing material alternative member 56. In the present embodiment, for example, the printing material alternative member 56 includes a sheet made of polyimide resin with a thickness of 200 μm. The printing material alternative member 56 is attached to the horizontal aligning reference plate 52 on the upstream side of the conveyance direction of the printing material. The width should be enough to cover the pressing member 67. Width here means the short side direction of the pressing member 67. Also, the length of the printing material alternative member 56 should be longer than the difference obtained by subtracting the length of the long side direction of the printing material of the minimum size from the length of the long side direction (long side direction of the heating member 67) of the printing material of the maximum size that can be used in formation by the booklet manufacturing apparatus 4.

Using the booklet manufacturing unit 50 provided with the thermocompression bonding member 61 provided with such a sheet, which is the printing material alternative member 56, booklet manufacture is performed in a similar manner as in the second embodiment described above. Accordingly, regarding at least the non-printing material portion on the upstream side of the horizontal aligning reference plate 52, the ceramic heater 70 and the pressing member 67 are brought close together with the printing material alternative member 56 inbetween, which allows plastic deformation caused by the heat of the preliminary heating to be prevented.

With the configuration described above, booklet manufacture using the printing material P of the minimum A5 size can be repeated in a similar manner as in the second embodiment. Also, booklet manufacture using the printing material P of the maximum A4 size is periodically performed. During such booklet manufacture, crease marks formed by degradation of the silicone rubber of the pressing member 67 are checked for. Thus, as in the second embodiment, throughout the service life of the booklet manufacturing apparatus 4, no crease marks occur and the change in the hardness of the silicone rubber is within 10°. Thus, it was confirmed that the third embodiment can have no problems.

Modified Example of Third Embodiment

Figure 18B:
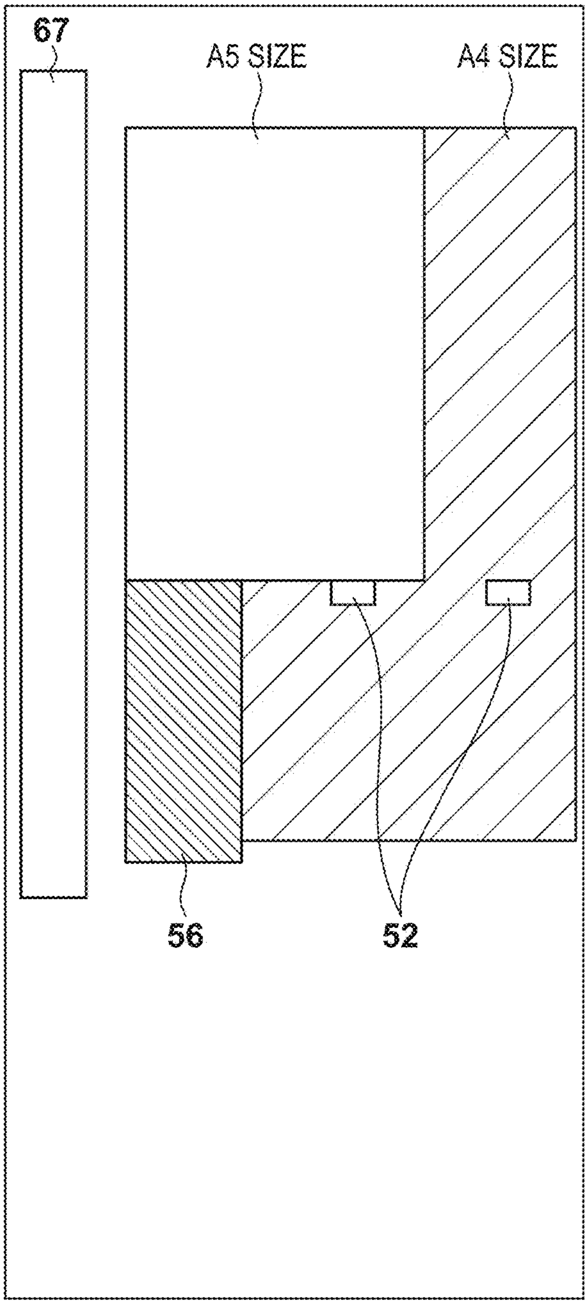
FIG. 18B is a diagram for describing the third embodiment of the present disclosure.

In the configuration described above, when a booklet is manufactured using a printing material of a size smaller than the maximum size, the pressing member 67 can be covered by the printing material alternative member 56 on the upstream side of the discharge direction of the booklet, but the downstream side cannot be covered. However, by aligning the upper side (side on the upper side of FIG. 18B, for example) of a booklet to be manufactured with the upper side of a booklet of the maximum size, as illustrated in FIG. 18B, the non-printing material portion of the pressing member 67 can be covered by the printing material alternative member 56, so that no uncovered portions remain. Thus, a control process is performed so that the horizontal aligning reference plate 52 (also referred to as a horizontal aligning reference member) is set at such a position. Regarding this, without performing steps S2102 and S2103 of FIG. 21, and in step S2101, the horizontal aligning reference plate 52 is moved to a position where the upper side of the booklet to be manufactured matches the upper side of a booklet of the maximum size. Accordingly, as illustrated in FIG. 18B, the non-printing material portion of the pressing member 67 is covered by the printing material alternative member 56, so that no portions that comes into direct contact with the ceramic heater 70 remain.

In this manner, the amount of heat transferred to the pressing member 67 can be reduced, plastic deformation can be prevented, and a decrease in the quality of manufactured booklets can be suppressed.

Other Modified Examples

In the embodiments described above, the heating temperature of the thermocompression bonding member when the preliminary heating process is performed is constant and the time is also constant. However, one or both of the heating temperature and the heating time may be variable. In a case where one or both are variable, the control unit 1901 controls the preliminary heating using the obtained (or estimated) temperature and time according to the temperature of the pressing member 67. The value of the temperature of the pressing member 67 may be registered in a table in which time and/or temperature are given as a parameter, and the time and temperature may be identified using the table. The temperature and time registered in the table may be experimentally determined so that the temperature of the pressing member 67 at the time of thermocompression bonding is 120° C. or greater, for example.

This booklet manufacturing apparatus has an advantage of performing control using a fixed temperature or a variable temperature in accordance with the temperature of the pressing member.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2024-013303, filed Jan. 31, 2024 which is hereby incorporated by reference herein in its entirety.

What is claimed is:

1. A booklet manufacturing apparatus configured to manufacture a booklet by thermocompression bonding a sheet stack including a plurality of sheets each having a bonding toner image formed at a predetermined portion, the booklet manufacturing apparatus comprising:

a thermocompression bonding head including a heater, the thermocompression bonding head being configured to heat the predetermined portion;

an elastic pressing pad disposed opposite the thermocompression bonding head such that the sheet stack is pressable between the thermocompression bonding head and the elastic pressing pad;

a sheet transport mechanism including at least one transport member configured to transport at least one sheet for forming the sheet stack to a bonding position at which the sheet stack is pressable between the thermocompression bonding head and the elastic pressing pad; and a controller such that:

when a temperature of the elastic pressing pad, before the at least one sheet enters the bonding position, is lower than a threshold, the controller is configured to (1) perform a preliminary heating operation by bringing the thermocompression bonding head and the elastic pressing pad into contact with each other before the at least one sheet enters the bonding position, thereby heating the elastic pressing pad, (2) thereafter separate the thermocompression bonding head and the elastic pressing pad from each other, and next cause the sheet transport mechanism to transport the at least one sheet to the bonding position, and perform a thermocompression bonding operation by pressing the sheet stack between the thermocompression bonding head and the elastic pressing pad and heating the predetermined portion using the heater; and when the temperature of the elastic pressing pad, before the at least one sheet enters the bonding position, is higher than the threshold, the controller is configured to perform the thermocompression bonding operation without performing the preliminary heating operation.

2. The booklet manufacturing apparatus according to claim 1, wherein the temperature of the elastic pressing pad used by the controller is based on an estimated temperature of the elastic pressing pad.

3. The booklet manufacturing apparatus according to claim 2, wherein the controller is configured to estimate the temperature of the elastic pressing pad based on at least one predetermined parameter including at least one of:

(a) an environmental temperature around the booklet manufacturing apparatus;

(b) a content of thermocompression bonding performed immediately before;

(c) an elapsed time from completion of the thermocompression bonding performed immediately before;

(d) a type of sheet used for the booklet;

(e) a number of sheets in the booklet to be manufactured; and (f) a number of booklets to be manufactured.

4. The booklet manufacturing apparatus according to claim 1, further comprising:

a temperature sensor that measures a temperature of the elastic pressing pad, wherein the temperature of the elastic pressing pad used by the controller is based on a measured temperature acquired from the temperature sensor.

5. The booklet manufacturing apparatus according to claim 1, wherein the controller is configured to change at least one of a heating time and a heating temperature of the preliminary heating operation according to the temperature of the elastic pressing pad.

6. The booklet manufacturing apparatus according to claim 1, wherein a pressing force applied during the preliminary heating operation is smaller than a pressing force applied during the thermocompression bonding operation.

7. The booklet manufacturing apparatus according to claim 1, wherein a bonding-toner for the bonding toner image includes a thermoplastic resin.

8. A booklet manufacturing system comprising:

an image forming apparatus configured to form, on a sheet, an image including a bonding-toner image; and a booklet manufacturing apparatus of claim 1, configured to receive the sheet and manufacture the booklet.

9. A booklet manufacturing apparatus configured to manufacture a booklet by thermocompression bonding a sheet stack including a plurality of sheets each having a bonding-toner image formed at a predetermined portion, the booklet manufacturing apparatus comprising:

a thermocompression bonding head including a heater, the thermocompression bonding head being configured to heat the predetermined portion;

an elastic pressing pad disposed opposite the thermocompression bonding head such that the sheet stack is pressable between the thermocompression bonding head and the elastic pressing pad;

a sheet transport mechanism including at least one transport member configured to transport at least one sheet for forming the sheet stack to a bonding position at which the sheet stack is pressable between the thermocompression bonding head and the elastic pressing pad;

a movable alignment reference plate movable in a longitudinal direction of the elastic pressing pad and configured to determine a longitudinal position of an end of the sheet stack for a thermocompression bonding operation; and a controller configured to, when a sheet size of a booklet to be manufactured is smaller than a maximum sheet size supported by the booklet manufacturing apparatus, change a position of the movable alignment reference plate between different thermocompression bonding operations or between different booklets, thereby changing a position of a region where no sheet is present between the thermocompression bonding head and the elastic pressing pad during the thermocompression bonding operation.

10. The booklet manufacturing apparatus according to claim 9, wherein the controller is configured to change the position of the movable alignment reference plate for each thermocompression bonding operation.

11. The booklet manufacturing apparatus according to claim 9, wherein the controller is configured to change the position of the movable alignment reference plate for each booklet.

12. The booklet manufacturing apparatus of claim 9, wherein the controller is further configured such that:

when a temperature of the elastic pressing pad, before the at least one sheet enters the bonding position, is lower than a threshold, the controller performs a preliminary heating operation by bringing the thermocompression bonding head and the elastic pressing pad into contact with each other before the at least one sheet enters the bonding position, and when the temperature is higher than the threshold, the controller performs the thermocompression bonding operation without performing the preliminary heating operation.

13. A booklet manufacturing apparatus configured to manufacture a booklet by thermocompression bonding a sheet stack including a plurality of sheets each having a bonding-toner image formed at a predetermined portion, the booklet manufacturing apparatus comprising:

a thermocompression bonding head including a heater, the thermocompression bonding head being configured to heat the predetermined portion;

an elastic pressing pad disposed opposite the thermocompression bonding head such that the sheet stack is pressable between the thermocompression bonding head and the elastic pressing pad;

a sheet transport mechanism including at least one transport member configured to transport at least one sheet for forming the sheet stack to a bonding position at which the sheet stack is pressable between the thermocompression bonding head and the elastic pressing pad;

a movable alignment reference plate movable in a longitudinal direction of the elastic pressing pad and configured to determine a longitudinal position of an end of the sheet stack for a thermocompression bonding operation;

a sheet-like substitute member provided on the movable alignment reference plate on a side opposite a side against which the sheet stack is aligned; and a controller configured to, when a sheet size of a booklet to be manufactured is smaller than a maximum sheet size supported by the booklet manufacturing apparatus, position the movable alignment reference plate such that, during the thermocompression bonding operation, the sheet-like substitute member is interposed between the thermocompression bonding head and a portion of the elastic pressing pad where no sheet is present.

14. The booklet manufacturing apparatus according to claim 13, wherein the controller is configured to position the movable alignment reference plate such that an edge of the sheet stack on a side opposite the movable alignment reference plate is aligned with a corresponding edge position for the maximum sheet size.

15. A control method for a booklet manufacturing apparatus configured to manufacture a booklet by thermocompression bonding a sheet stack including a plurality of sheets each having a bonding-toner image formed at a predetermined portion, the control method comprising:

determining whether a temperature of an elastic pressing pad, before at least one sheet enters a bonding position at which the sheet stack is pressable between a thermocompression bonding head and an elastic pressing pad, is lower than a threshold;

when the temperature is lower than the threshold, performing a preliminary heating operation by bringing the thermocompression bonding head and the elastic pressing pad into contact with each other before the at least one sheet enters the bonding position, thereafter separating the thermocompression bonding head and the elastic pressing pad from each other, and then transporting the at least one sheet to the bonding position;

performing a thermocompression bonding operation by pressing the sheet stack between the thermocompression bonding head and the elastic pressing pad and heating the predetermined portion using a heater of the thermocompression bonding head; and when the temperature is higher than the threshold, performing the thermocompression bonding operation without performing the preliminary heating operation.

16. A non-transitory computer-readable storage medium storing instructions that, when executed by a controller of a booklet manufacturing apparatus, cause the controller to perform the control method of claim 15.

* * * * *